US012686577B2

(12) United States Patent
Cheng et al.

(10) Patent No.: US 12,686,577 B2
(45) Date of Patent: Jul. 21, 2026

(54) TRANSPORTATION CONTROL SYSTEM, TRANSPORTATION DEVICE, AND TRANSPORTATION CONTROL METHOD

(71) Applicant: Wistron Corporation, New Taipei City (TW)

(72) Inventors: Yue-Se Cheng, New Taipei City (TW); Shun-Chi Yeh, New Taipei City (TW); Jiang-Nan Ma, New Taipei City (TW); Fu-Hua Yan, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 419 days.

(21) Appl. No.: 18/462,528

(22) Filed: Sep. 7, 2023

(65) Prior Publication Data

US 2024/0417195 A1     Dec. 19, 2024

(30) Foreign Application Priority Data

Jun. 15, 2023     (CN) .......................... 202310716170.9

(51) Int. Cl.
B65G 69/24          (2006.01)
B65G 67/02          (2006.01)
(Continued)

(52) U.S. Cl.
CPC ............. B65G 69/26 (2013.01); B65G 67/02 (2013.01); B65G 69/006 (2013.01); B65G 69/24 (2013.01)

(58) Field of Classification Search
CPC ........ B65G 67/20; B65G 69/26; B65G 69/24; B65G 67/02; B65G 69/006; B65G 69/2817
See application file for complete search history.

(56) References Cited

U.S. PATENT DOCUMENTS 11,841,234 B1 *  12/2023  Gross ................. G06Q 30/0279
11,923,552 B2 *  3/2024  Harris, III ........... H01M 50/519
(Continued)

FOREIGN PATENT DOCUMENTS

CN        111731883 A     10/2020
CN        114655731 A     6/2022

OTHER PUBLICATIONS

Xu et al., A proof-of-concept demonstration for the transportation electrification education, 2014, IEEE, p. 1-5 (Year: 2014).*
(Continued)

*Primary Examiner* — McDieunel Marc
(74) *Attorney, Agent, or Firm* — McClure, Qualey & Rodack, LLP

(57)          ABSTRACT

A transportation control system, a transportation device, and a transportation control method related to an automated transportation control method are used to provide automated transportation between platforms which are not interconnected. The transportation control method includes receiving a sensed signal which corresponds to a location of a transportation platform, generating a first motion command according to the sensed signal, transmitting the first motion command to a controller which controls the transportation platform, sensing a location of the transportation platform from different sensing locations to generate the sensed signal, transmitting the sensed signal through a network, and controlling the transportation platform to move by the controller in response to the first motion command.

20 Claims, 14 Drawing Sheets

(51) Int. Cl.
    *B65G 69/00*        (2006.01)
    *B65G 69/26*        (2006.01)

(56) References Cited

U.S. PATENT DOCUMENTS

| | | | |
|---|---|---|---|
| 12,492,110 B2 * | 12/2025 | Zahdeh | B66F 9/07586 |
| 2008/0300055 A1 * | 12/2008 | Lutnick | G07F 17/3209 |
| | | | 463/39 |
| 2022/0278404 A1 * | 9/2022 | Harris, III | H01M 50/502 |
| 2023/0090269 A1 * | 3/2023 | Vasudevan | G06F 16/583 |
| | | | 382/317 |
| 2025/0368087 A1 * | 12/2025 | Han, Sr. | B60L 53/80 |

OTHER PUBLICATIONS

Chestnut et al., Communication and control for transportation, 1968, IEEE, p. 544-555 (Year: 1968).*
Qayum et al., Control of autonomous cars for intelligent transportation system, 2012, IEEE, pg., (Year: 2012).*
Meng et al., Research and Design of Intelligent Transportation System of the Terminal Site Based on GPRS, 2011, IEEE, p. 174-177 (Year: 2011).*
Shi et al., TagAttention: Mobile Object Tracing With Zero Appearance Knowledge by Vision-RFID Fusion, 2021, IEEE, pg., (Year: 2021).*
Examination report dated Jan. 8, 2025, listed in related Taiwan patent application No. 112124413.

* cited by examiner

710

711

715

Dfb

714

713

θy

718

H

717

716

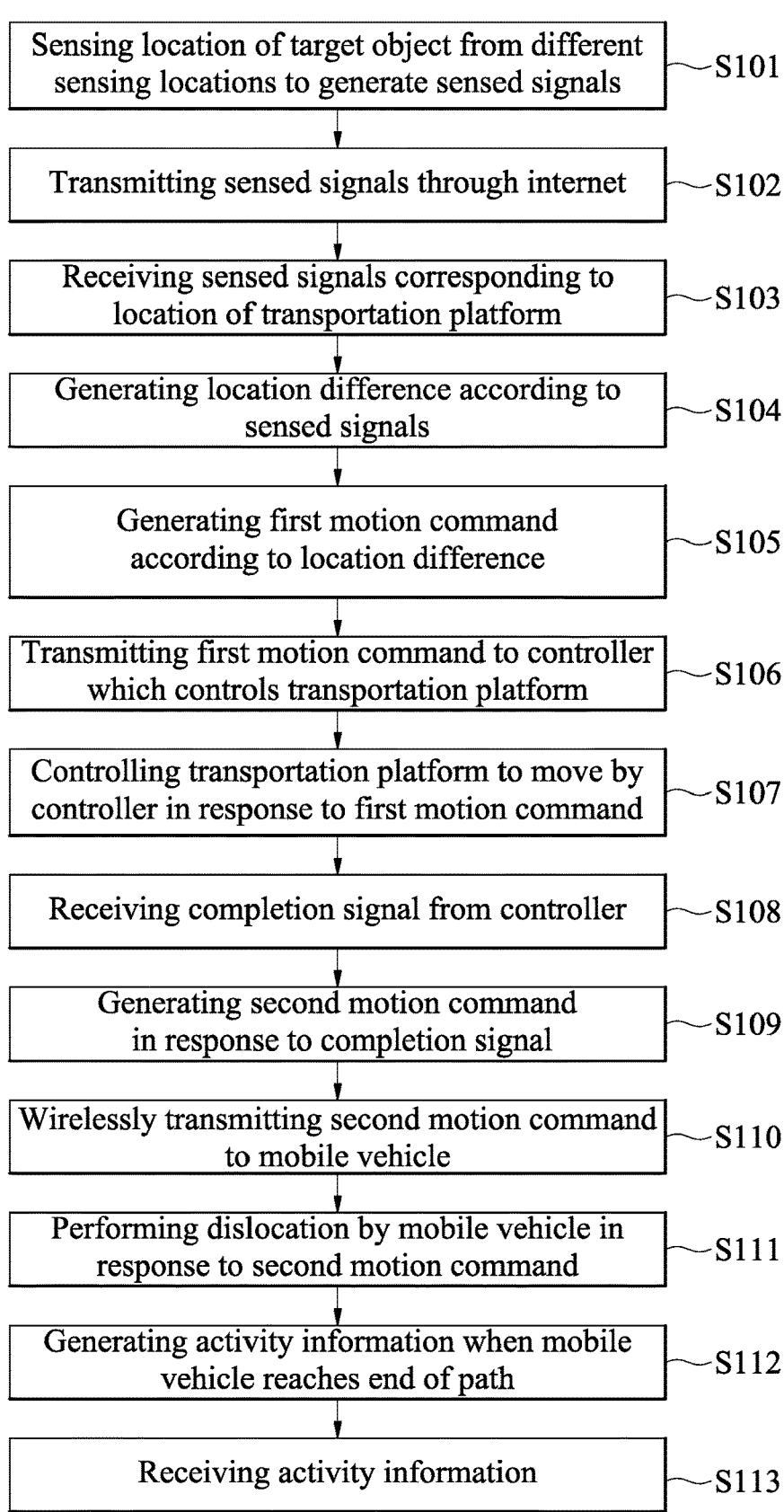

Sensing location of target object from different sensing locations to generate sensed signals —S101

Transmitting sensed signals through internet —S102

Receiving sensed signals corresponding to location of transportation platform —S103

Generating location difference according to sensed signals —S104

Generating first motion command according to location difference —S105

Transmitting first motion command to controller which controls transportation platform —S106

Controlling transportation platform to move by controller in response to first motion command —S107

Receiving completion signal from controller —S108

Generating second motion command in response to completion signal —S109

Wirelessly transmitting second motion command to mobile vehicle —S110

Performing dislocation by mobile vehicle in response to second motion command —S111

Generating activity information when mobile vehicle reaches end of path —S112

Receiving activity information —S113

Fig. 11

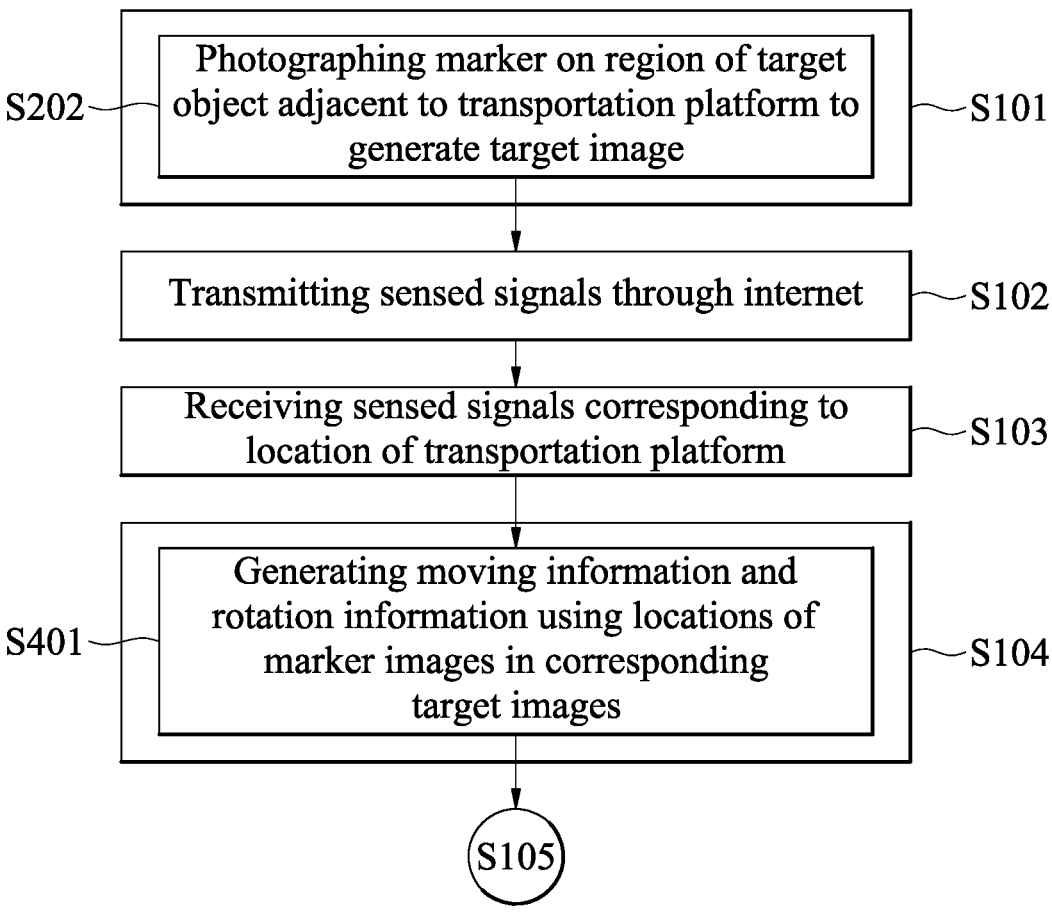

S202 —— Photographing marker on region of target object adjacent to transportation platform to generate target image —— S101

Transmitting sensed signals through internet —— S102

Receiving sensed signals corresponding to location of transportation platform —— S103

S401 —— Generating moving information and rotation information using locations of marker images in corresponding target images —— S104

TRANSPORTATION CONTROL SYSTEM, TRANSPORTATION DEVICE, AND TRANSPORTATION CONTROL METHOD

CROSS-REFERENCE TO RELATED APPLICATION

This non-provisional application claims priority under 35 U.S.C. § 119(a) to patent application Ser. No. 202310716170.9 filed in China, P.R.C. on Jun. 15, 2023, the entire contents of which are hereby incorporated by reference.

BACKGROUND

Technical Field

The instant disclosure is related to a transportation platform bridging a transportation device and a stopping station, especially a transportation control system, a transportation device, and a method of controlling the transportation control system.

Related Art

The process of existing manual loading and unloading of goods generally includes: a truck is stopped at a dock, and then the rear door of the truck is opened; a transportation platform is activated to connect with the truck; the goods are transported from the interior of the truck onto the transportation platform; the transportation platform is activated to connect with the dock; and the goods are transported from the transportation platform to the dock. This process utilizes the transportation platform to bridge the truck and the dock, so that the issues of inconvenience of loading/unloading due to a height difference between two ends (the truck and the dock) and reliance on certain labor to carry the goods can be resolved. However, this process includes many manual operation procedures, and therefore opportunities of operational errors are increased. As a result, the risk of damage to personnel and/or goods is increased. For example, the force of a person pushing/pulling a container or a trolley may not be properly managed, and consequently the goods may fall down the transportation platform or be damaged, or body parts of the person may even be bumped or pushed down by the container or the trolley loading the goods; the precision of the control of the transportation platform may not be sufficient; and/or the person may bump or push down his/her body parts and/or the goods due to bad lighting (such as in the dim interior of the truck or when the goods are large enough to block the view). On the other hand, each procedure has to be performed slowly and precisely in order to avoid errors, and therefore the time for the overall process is significantly increased.

SUMMARY

Based on the above reasons, one or some embodiments of the instant disclosure provides a transportation control system, a transportation device, and a transportation control method, so as to resolve issues of loading/unloading inconvenience, the need to carry heavy goods, high operation errors, and/or time consuming.

In some embodiments, the transportation control system comprises a first receiving unit, a processor, a first emitting unit, a transportation platform, a second receiving unit, a controller, a location sensing module, and a second emitting unit. The first receiving unit is configured to receive a sensed signal which corresponds to a location of the transportation platform. The processor is coupled to the first receiving unit and configured to generate a first motion command according to the sensed signal. The first emitting unit is coupled to the processor and configured to transmit the first motion command. The second receiving unit is on the transportation platform and configured to be wirelessly connected to the first emitting unit. The controller is on the transportation platform and configured to receive the first motion command from the first emitting unit through the second receiving unit and execute the first motion command so as to control the transportation platform to move. The location sensing module is configured to generate the sensed signal. The second emitting unit is coupled to the location sensing module and configured to be wirelessly connected to the first receiving unit so as to transmit the sensed signal to the first receiving unit.

In some embodiments, the sensed signal comprises a distance information and a target image; the processor generates a location difference according to the sensed signal, and the processor generates the first motion command according to the location difference, wherein the first motion command indicates moving by the location difference; the location difference comprises a moving information and a rotation information; and the location sensing module comprises a distance measurement module and a camera module. The distance measurement module is coupled to the second emitting unit and configured to measure a distance between the distance measurement module and a target object so as to generate the at least one distance information which indicates the distance. The camera module is coupled to the second emitting unit and configured to photograph a marker on the target object so as to generate the target image.

In some embodiments, the distance measurement module and the camera module are disposed on the transportation platform.

In some embodiments, the sensed signal comprises target images, and the location sensing module comprises camera modules; the camera modules are configured to photograph an edge of the target object from different sensing locations so as to generate the target images.

In some embodiments, the camera modules are disposed at a periphery of the transportation platform, thus a preset distance is maintained between each of the camera modules and the transportation platform, and the camera modules are configured to photograph the target object from different sensing locations.

In some embodiments, the second emitting unit and the camera modules are disposed on different sensing locations of the transportation platform, and each of the camera modules is configured to photograph a marker on the target object from a different sensing location.

In some embodiments, the transportation control system further comprises a mobile vehicle configured to be wirelessly connected to the first emitting unit; the processer is configured to further generate a second motion command which indicates a path; and the mobile vehicle is configured to perform a displacement of the path according to the second motion command.

In some embodiments, the motion mechanism comprises a plurality of electric cylinders controlled by the controller, wherein the controller is configured to control the electric cylinders according to the first motion command so that the electric cylinders adjust the location of the platform body.

In some embodiments, the location of the platform body is adjusted by a location difference, and the motion mechanism comprises a connection body, a slide rail, a sliding portion, a support body, and a support rod. The slide rail is on a top surface of the connection body. The sliding portion is fixed at a bottom surface of the platform body and slidably connected to the slide rail. The controller is configured to control the sliding portion according to the first motion command so that the sliding portion moves by translation information with respect to the slide rail. The support body has a connection portion. The support rod is matched with the connection portion. One of the support body and the support rod is coupled to the bottom surface of the connection body. The controller is configured to control the support rod and the support body according to the first motion command, so that the support rod and the support body relatively extend or retract by lift information and relatively rotate by the rotation information.

In some embodiments, a transportation device comprises a transportation platform, a controller, a location sensing module, and an emitting unit. The transportation platform comprises a platform body and a motion mechanism. The motion mechanism supports the platform body. The controller is coupled to the motion mechanism and configured to control the motion mechanism according to the first motion command so that the motion mechanism adjusts a location of the platform body. The location sensing module is configured to sense a target object in front of the transportation platform so as to generate a sensed signal. The emitting unit is coupled to the at least one location sensing module and configured to transmit the at least one sensed signal.

In some embodiments, a transportation control method comprises: receiving a sensed signal which corresponds to a location of a transportation platform; generating a first motion command according to the sensed signal; transmitting the first motion command to a controller which controls the transportation platform; sensing a location of a target object from different sensing locations so as to generate the at least one sensed signal; transmitting the sensed signal through a network; and controlling the transportation platform to move by the controller in response to the first motion command.

As above, the transportation control system, the transportation device, and the transportation control method according to any of the embodiments can provide automated transportation between two platforms which are not interconnected and can automatically calibrate the connection between the transportation platform and the other platform. In some embodiments, the transportation control system or the transportation control method can further control the timing of movement of the mobile vehicle, so that the mobile vehicle moves between the two platforms. For example, the transportation control system or the transportation control method can control the timing of movement of an automated guided vehicle (AGV) so as to replace goods transportation between two platforms using manual labor, so that operational errors can be avoided.

BRIEF DESCRIPTION OF THE DRAWINGS

The instant disclosure will become more fully understood from the detailed description given herein below for illustration only and therefore not limitative of the instant disclosure, wherein:

FIG. 11 illustrates a flow chart of a transportation control method of the first embodiment;

FIG. 13 illustrates a partial flow chart of a second exemplary implementation of the transportation control method shown in FIG. 11.

DETAILED DESCRIPTION

Regarding terms of "couple" or "connect" of the instant disclosure, if not specifically illustrated, these terms are used to refer to that two or multiple elements directly and physically/electrically contact each other or indirectly and physically/electrically contact each other. The term "processor" or "controller" is not limited to a single device and may refer to one or multiple processing circuits able to perform corresponding functions, wherein a processing circuit is a microprocessor, a micro controller, a digital signal processor, a central processor, a system on chip (SOC), a programmable logic controller, a state machine, a logic circuit, an analog circuit, a digital circuit, or any analog and/or digital device which performs signal processing based on instructions.

Figure 1:
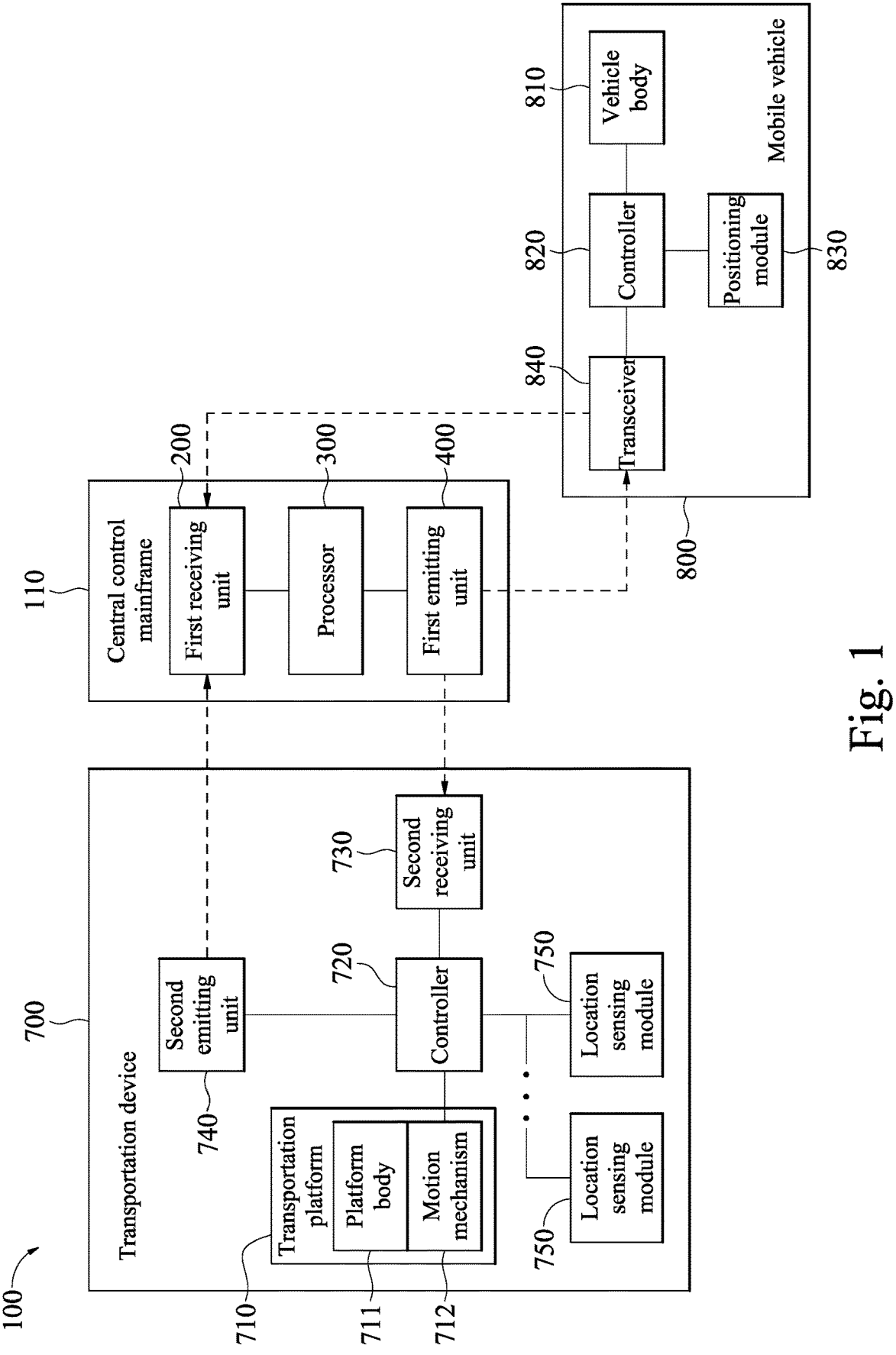
FIG. 1 illustrates a schematic block diagram of a transportation control system according to a first embodiment of the instant disclosure.

Please refer to FIG. 1. A transportation control system 100 comprises a central control mainframe 110. The central control mainframe 110 comprises a receiving unit (referred to as a first receiving unit 200 hereinafter), a processor 300, and an emitting unit (referred to as a first emitting unit 400 hereinafter). The processor 300 is coupled to the first receiving unit 200 and the first emitting unit 400.

In some embodiments, the central control mainframe 110 may be implemented using a computer cluster, a server, a mainframe computer, a supercomputer, or the like. In some embodiments, the first receiving unit 200 and the first emitting unit 400 may be implemented using a single transceiver or using a receiver and an emitter which are independent from each other.

Figure 3:
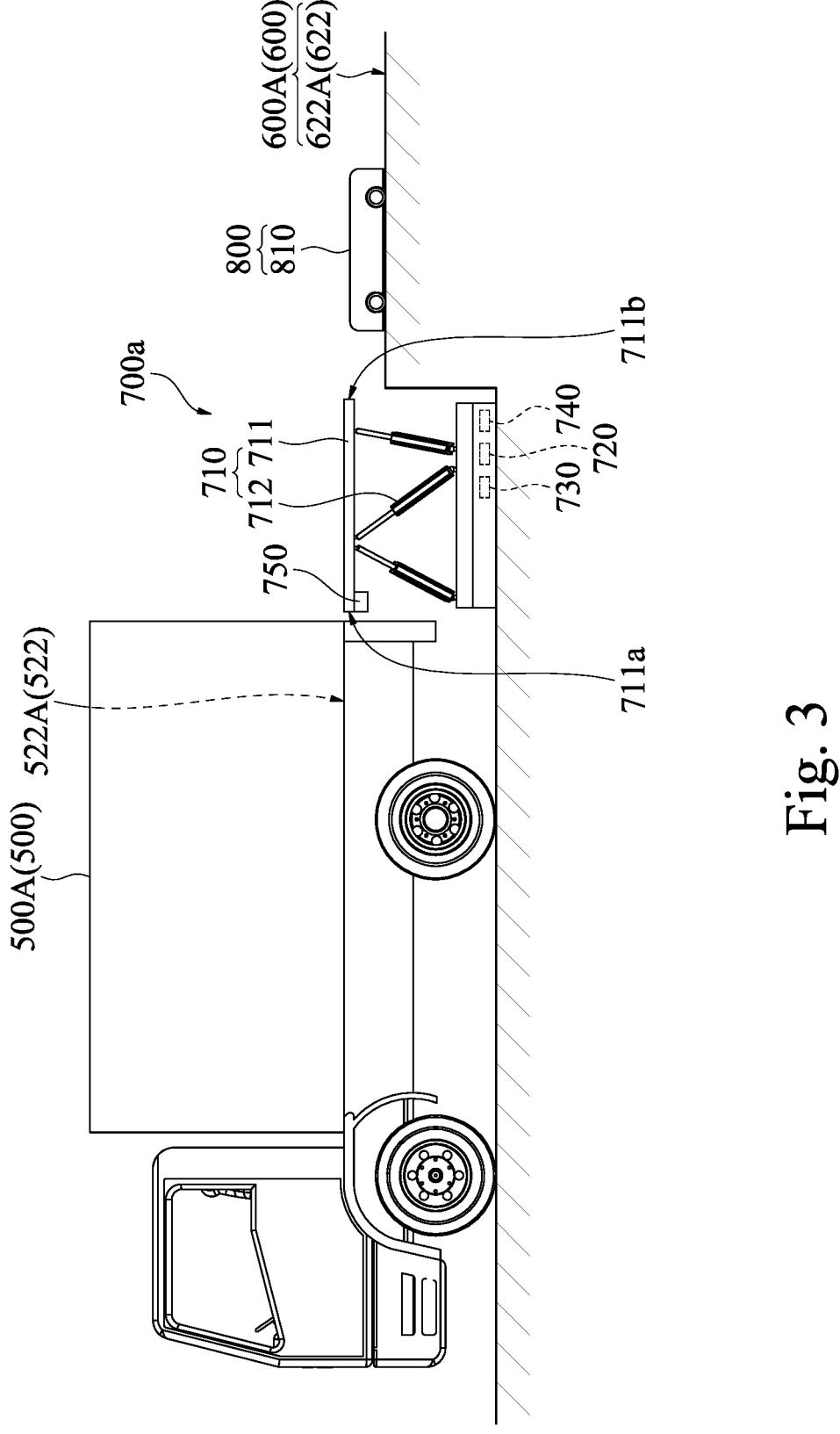
FIG. 3 illustrates a schematic view of the transportation control system shown in FIG. 2 under an exemplary application scenario.
Figure 4:
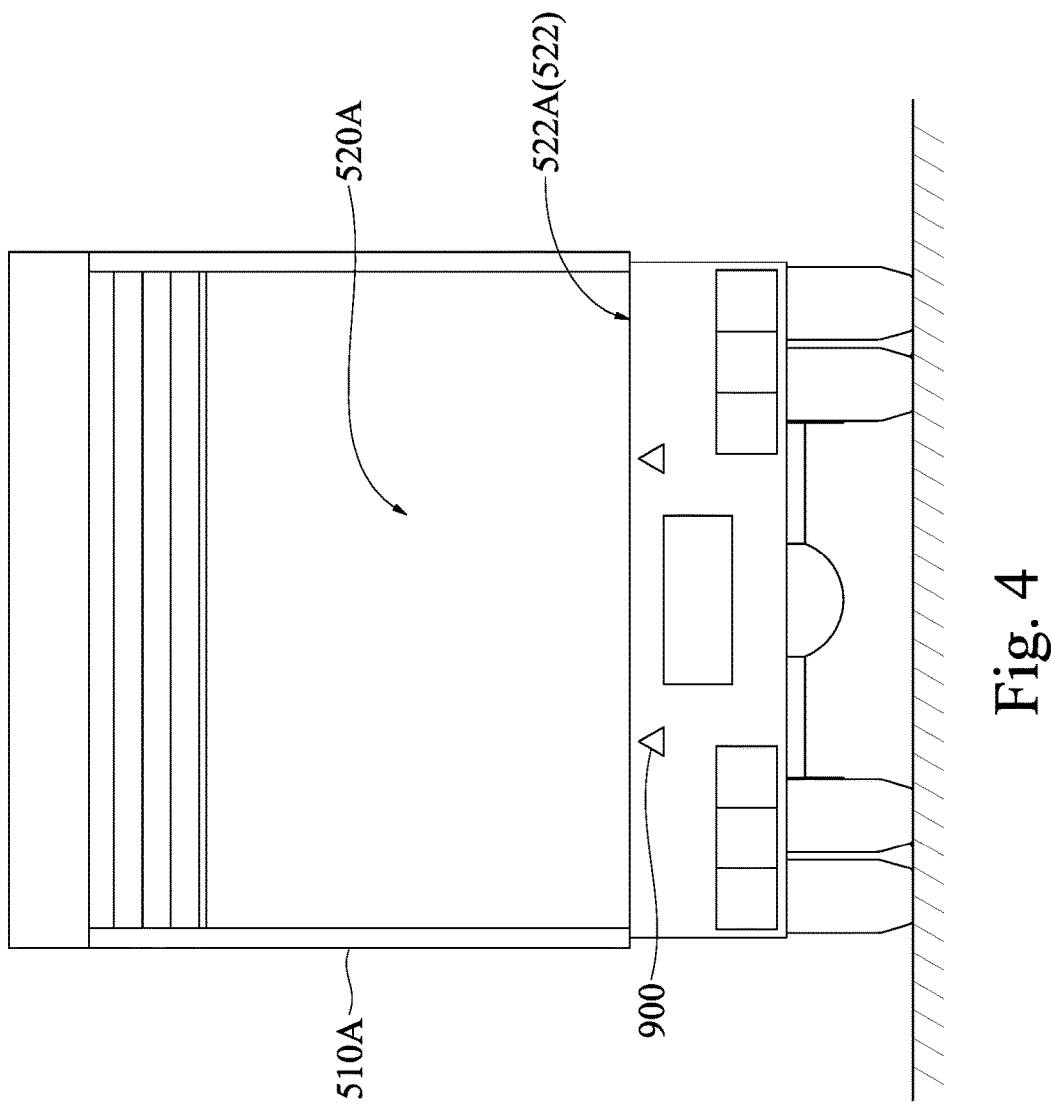
FIG. 4 illustrates a schematic view of a rear view of an exemplary implementation of a target object shown in FIG. 3.

In some embodiments, the central control mainframe 110 is adapted to monitor a transportation device 700. Consequently, when the transportation device 700 provides a bridging path between the two planes 522, 622 of the two target objects 500, 600, the central control mainframe 110 can control the transportation device 700 to automatically connect with the plane 522/622 of one of two target objects 500/600, as shown in FIG. 3 and FIG. 4. In some embodiments, the target object 500 may be a mobile transportation device, while the target object 600 may be a stopping station 600A (or referred to as a dock or a platform) which is stationary. In some embodiments, the target object 500 may for example be various transportation devices such as a truck 500A, a mass rapid transit (MRT) car, a train car, or an airplane.

For example, assume that the target object 500 is the truck 500A and that the target object 600 is the stopping station 600A. In this example, the plane 522 is an internal bottom surface 552A of a container 510A of the truck 500A (i.e., a bottom surface on a side of an internal space 520A of the container 510A), and the other platform 622 is a floor 622A of the stopping station 600A. In this example, the central control mainframe 110 can be used to monitor the process of the transportation device 700 connecting with the internal bottom surface 522A of the truck 500A.

In some embodiments, in the case that the transportation device 700 provides the bridging path between the two planes 522, 622 of the two target objects 500, 600, the transportation control system 100 may be designed so that only a connection procedure for the transportation device 700 and the target object 500 (which is mobile) is performed through the monitoring of the central control mainframe 110 on the transportation device 700. In other words, in some embodiments, the default state of the transportation device 700 is a configuration state where one of two sides of the transportation device 700 is connected to the platform 622 of the target object 600 (which is stationary); when an access to the target object 500 is required, the central control mainframe 110 then controls the transportation device 700 to perform automated connection between the other side of the transportation device 700 and the plane 522 of the target object 500. In some other embodiments, in the case that the transportation device 700 provides the bridging path between the two planes 522, 622 of the two target objects 500, 600, both of the connection procedure for the transportation device 700 and the target object 500 (which is mobile) and the connection procedure for the transportation device 700 and the target object 600 (which is stationary) are performed through the monitoring of the central control mainframe 110 on the transportation device 700.

Figure 7:
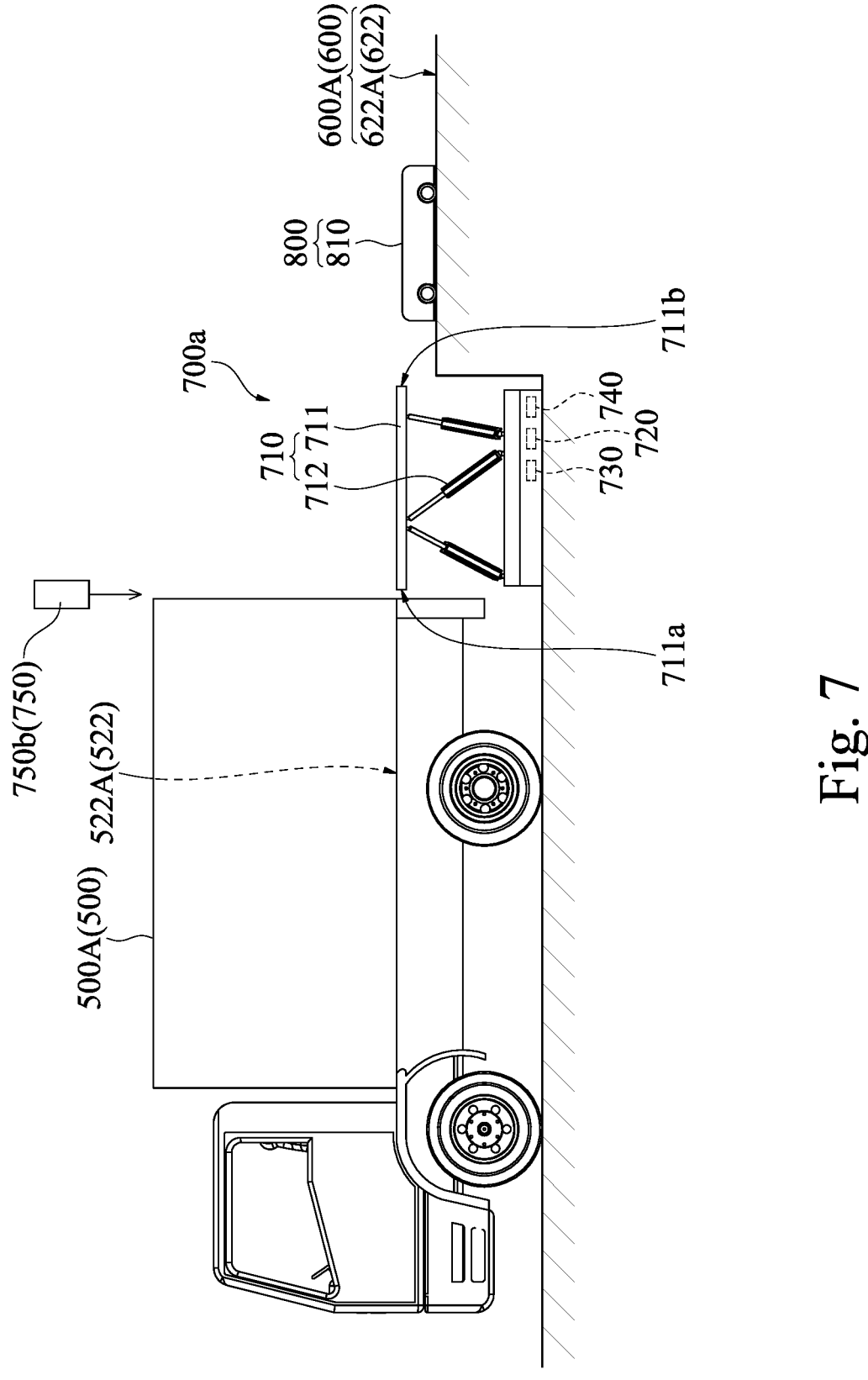
FIG. 7 illustrates a schematic view of the transportation control system shown in FIG. 6 under an exemplary application scenario.

Specifically, referring to FIG. 1, in some embodiments, the transportation control system 100 further comprises a transportation device 700. The transportation device 700 comprises a transportation platform 710, a controller 720, another receiving unit (referred to as a second receiving unit 730 hereinafter), another emitting unit (referred to as a second emitting unit 740 hereinafter), and at least one location sensing module 750. The controller 720 is coupled to the second receiving unit 730, the second emitting unit 740 and each of the at least one location sensing module 750. The controller 720, the second receiving unit 730, and the second emitting unit 740 are on the transportation platform 710. In some embodiments, the location sensing module 750 may be on the transportation platform 710. For example, the location sensing module 750 may be disposed at an edge of a platform body 711 of the transportation platform 710 and face toward the exterior of the platform body 711 of the transportation platform 710, as shown in FIG. 3. In some other embodiments, the location sensing module 750 may also be disposed at a periphery of the transportation platform 710, and thus a preset distance is maintained between the location sensing module 750 and the transportation platform 710. For example, the location sensing module 750 may be above, on the left, or on the right of the edge of the platform body 711 of the transportation platform 710; or the location sensing module 750 may have a preset distance apart from the platform body 711 of the transportation platform 710 and face toward the edge of the transportation platform 710, as shown in FIG. 7. In this embodiment, the preset distance may be less than or equal to a sensing distance of the location sensing module 750. In an embodiment, if the location sensing module 750 is a camera module 750*b*, the preset distance may be a focal distance of the camera module 750*b*.

In some embodiments, the second receiving unit 730 and the second emitting unit 740 may be implemented using a single transceiver or using a receiver and an emitter which are independent from each other.

Figure 5:
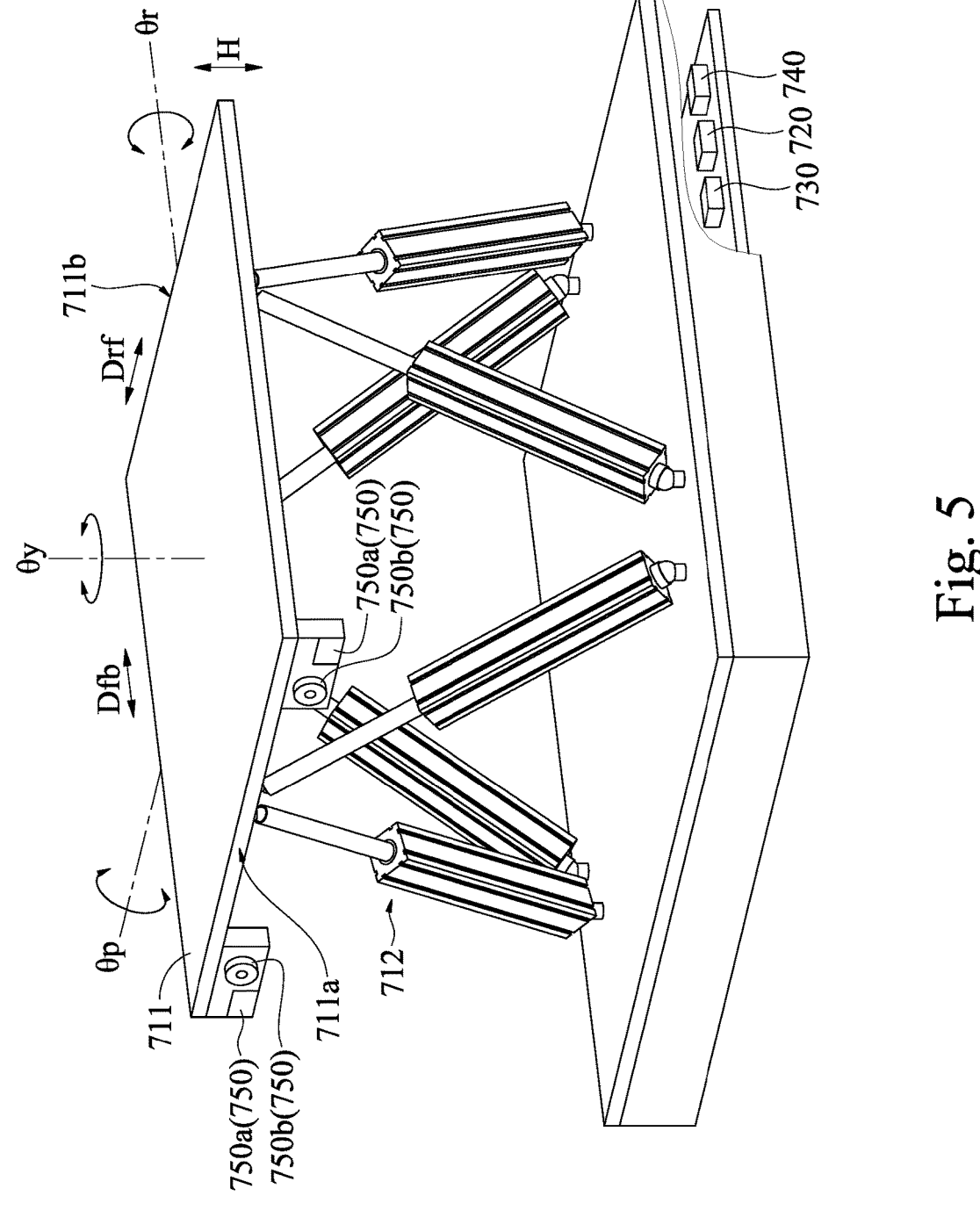
FIG. 5 illustrates a schematic perspective view of an exemplary implementation of the transportation device shown in FIG. 3.

In some embodiments, the transportation platform 710 comprises a platform body 711 and a motion mechanism 712, as shown in FIG. 5. Please refer to FIG. 1 and FIG. 5. The motion mechanism 712 supports the platform body 711. The controller 720 is coupled to the motion mechanism 712, the second receiving unit 730, and the second emitting unit 740. Therefore, the second emitting unit 740 can be electrically coupled to the location sensing module 750 through the controller 720.

In some embodiments, referring to FIG. 1 and FIG. 11, when the monitoring procedure of the transportation device 700 (the step S101 through the step S108) is being performed, the processor 300 transmits a sensing request to the transportation device 700 through the first emitting unit 400. The controller 720 receives the sensing request from the central control mainframe 110 through the second receiving unit 730 and actuates, in response to the sensing request, the location sensing modules 750 to perform sensing. Now, the location sensing modules 750 sense the location of the target object 500 from different sensing locations (such as by sensing a relative location between the platform body 711 of the transportation platform 710 and the target object 500 or by sensing a coordinate of the target object 500, where the coordinate of the target object 500 may be from a positioning device optionally provided on the target object 500) so as to generate at least one sensed signal (the step S101), as shown in FIG. 3 or FIG. 7. The location of the transportation platform 710 mentioned in some embodiments of the instant disclosure refers to the location of the platform body 711 of the transportation platform 710 relative to the target object 500. In other words, in some embodiments, the location sensing modules 750 are disposed at different locations on the transportation platform 710, and the location sensing modules 750 sense the edge of the platform body 711 adjacent to the target object 500 with identical or different sensing techniques, as shown in FIG. 3 and FIG. 7. Therefore, each of the sensed signals corresponds to the location of the transportation platform 710.

Please refer back to FIG. 1 and FIG. 11. Then, the transportation device 700 transmits the sensed signals to the central control mainframe 110 by the second emitting unit 740 through a network (the step S102). Next, the first receiving unit 200 of the central control mainframe 110 receives the sensed signals from the transportation device 700 (the step S103) and provides the received sensed signals for the processor 300 so as to perform signal processing.

After the step S103, the processor 300 generates a location difference according to the received sensed signals (the step S104), and the processor 300 generates the first motion command according to the location difference, wherein the first motion command indicates moving by the location difference (the step S105). Then, the processor 300 transmits the first motion command to the transportation device 700 through the first emitting unit 400, so that the controller 720 of the transportation device 700 receives the first motion command from the central control mainframe 110 through the second receiving unit 730 (the step S104).

Figure 9:
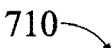
FIG. 9 illustrates an exploded view of the transportation platform shown in FIG. 8.

After the step S106 and after the controller 720 receives the first motion command from the second receiving unit 730, the controller 720 will control, in response to the first motion command, the transportation platform 710 to perform moving by the location difference (the step S107). In other words, in some embodiments, under the control of the controller 720, the motion mechanism 712 moves the location of the platform body 711 by the location difference. In some embodiments, the location difference may include translation information Dfb, Drf, lift information H, rotation information θp, θr, θy or any combination thereof, as shown in FIG. 5 or FIG. 9. In some embodiments, a moving information comprises the translation information Dfb, Drf and the lift information H.

In some embodiments of the step S107, the location difference comprises the translation information Dfb, Drf, the lift information H, and the rotation information θp, θr, θy, as shown in FIG. 5. Under the control of the controller 720, the motion mechanism 712 translates the transportation platform 710 by a distance/distances of the translation information Dfb, Drf, adjusts the transportation platform 710 by a height of the lift information H, and rotates the transportation platform 710 by an angle/angles of the rotation information θp, θr, θy. For example, referring to FIG. 1, FIG. 3, and FIG. 5 and taking the example where the location difference comprises the translation information Dfb, Drf, the lift information H, and the rotation information θp, θr, θy, the controller 720 obtains a translation direction and a translation amount (such as a translation vector) indicated by the translation information Dfb, Drf, a lift direction and a vertical movement amount (such as a vertical movement vector) indicated by the lift information H, and a rotation direction and a rotation angle indicated by the rotation information θp, θr, θy. Then, the motion mechanism 712 will move the platform body 711 by the distance of the translation amount in the translation direction, move the platform body 711 by the height of the vertical movement amount in the lift direction, and rotate the platform body 711 by the rotation angle toward the rotation direction.

After the step S107, i.e., in some embodiments, after the motion mechanism 712 adjusts the location of the platform body 711 according to the location difference, the controller 720 transmits a completion signal to the central control mainframe 110 through the second emitting unit 740. Therefore, the controller 720 can notify the central control mainframe 110, with the completion signal, that the adjustment of the location of the transportation platform 710 has been completed. In this embodiment, the processor 300 receives the completion signal from the controller 720 through the first receiving unit 200 (the step S108) so as to learn that the transportation device 700 has completed the connection.

In some embodiments, after the processor 300 receives the completion signal (the step S108), the processor 300 can once again execute the step S101 through the step S104 and then once again generate the resulted location difference in order to confirm whether the location of the transportation platform 710 has been moved to the correct location. If that the correct location has been reached is confirmed, other procedures can be performed subsequently. If that the correct location has not been reached is confirmed, the step S105 and subsequent steps can be performed next, until that the transportation platform 710 has been moved to the correct location is confirmed. In some embodiments, when all information of the location differences has been generated as 0, the processor 300 can confirm that the transportation platform 710 has been moved to the correct location accordingly. On the contrary, when any of the information of the location differences has been generated as not 0, the processor 300 can confirm that the transportation platform 710 has not been moved to the correct location accordingly.

In this way, in some embodiments, under the monitoring of the central control mainframe 110, one side 711a/711b of the transportation platform 710 can be precisely and automatically connected to the plane 522/622 of the target object 500/600.

For example, taking the example where the transportation device 700 is used to bridge the truck 500A and the stopping station 600A, the transportation platform 710 has two opposite sides 711a, 711b and two locations (referred to as a first location and a second location hereinafter). At the first location, the side 711b of the transportation platform 710 is connected to the floor 622A of the stopping station 600A. At the second location, the side 711a of the transportation platform 710 is connected to the internal bottom surface 552A of the truck 500A.

In this exemplary embodiment, the transportation control system 100 can execute the monitoring procedure of the transportation device 700 (the step S101 through the step S108) so that the side 711a of the transportation platform 710 is automatically connected to the internal bottom surface 522A of the truck 500A. Besides, the transportation control system 100 can further execute the monitoring procedure of the transportation device 700 (the step S101 through the step S108) so that the side 711b of the transportation platform 710 is automatically connected to the floor 622A of the stopping station 600A. In another exemplary embodiment, continuing from the previous example, the transportation control system 100 may be defaulted to that "the first location of the transportation platform 710 is an initial location," i.e., the transportation platform 710 is normally at the first location. When the transportation platform 710 is to be switched to being at the second location, the transportation control system 100 once again executes the monitoring procedure of the transportation device 700 (the step S101 through the step S108), so that the side 711a of the transportation platform 710 approaches the truck 500A. Therefore, the side 711a of the transportation platform 710 and the edge of the internal bottom surface 522A of the truck 500A are in contact with each other (i.e., the second location).

Please refer to FIG. 1 and FIG. 11. In some embodiments, referring to FIG. 1, the central control mainframe 110 is further configured to monitor a mobile vehicle 800 so that the mobile vehicle 800 moves between the transportation device 700 and a plane 522/622, as shown in FIG. 3. In some embodiments, the mobile vehicle 800 may be an automatic guided vehicle (AGV), etc.

Figure 10:
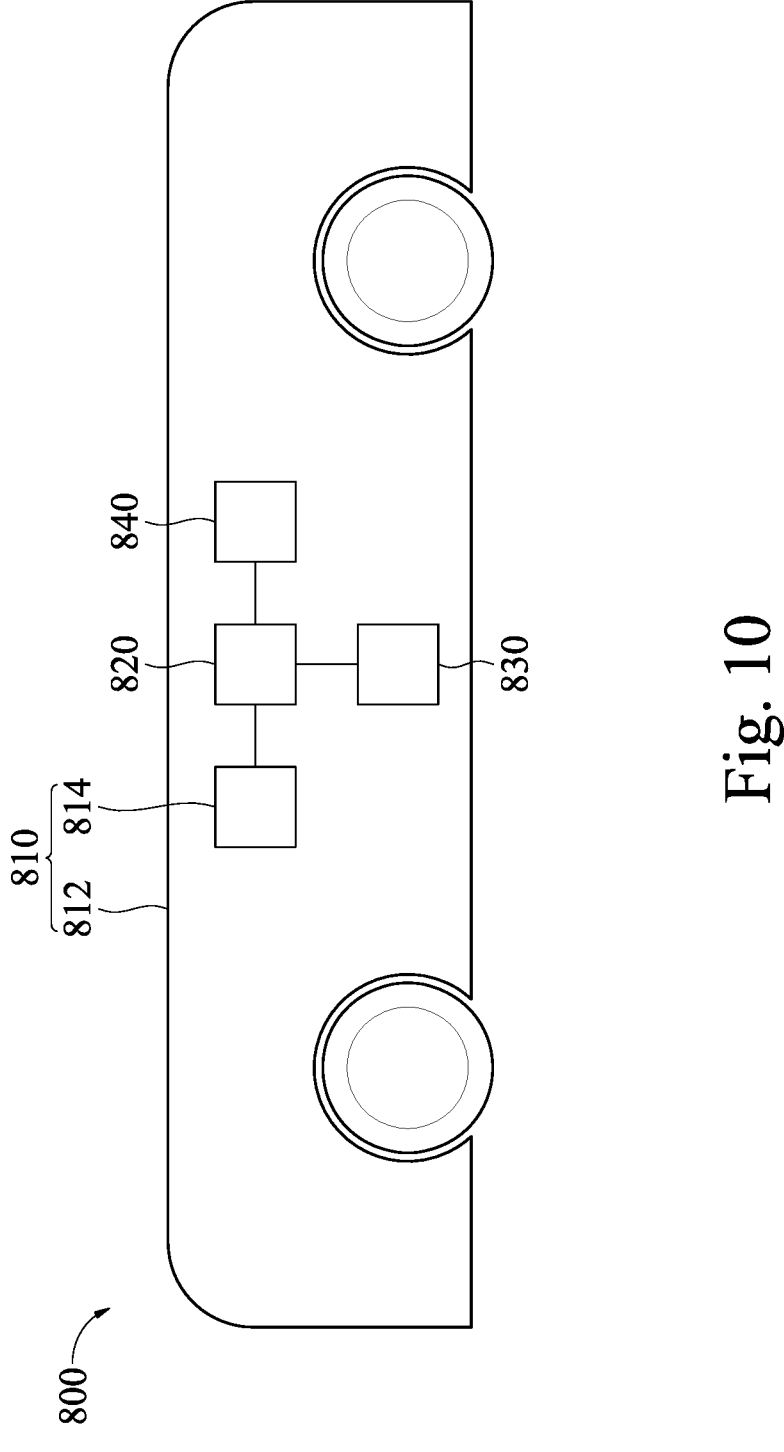
FIG. 10 illustrates a schematic view of an exemplary implementation of the mobile vehicle shown in FIG. 3 or FIG. 7.

In some embodiments, referring to FIG. 1 and FIG. 10, the mobile vehicle 800 comprises a vehicle body 810, a controller 820, a positioning module 830, and a transceiver 840.

The controller 820, the positioning module 830, and the transceiver 840 are disposed on the vehicle body 810. Specifically, in some embodiments, the controller 820, the positioning module 830, and the transceiver 840 are inside a housing 812 of the vehicle body 810. The controller 820 is coupled to the positioning module 830, the transceiver 840, and a mobile mechanism 814 of the vehicle body 810 and is configured to control the operation of each of the elements of the mobile vehicle 800. In this embodiment, the transceiver 840 is configured to be wirelessly connected to the first receiving unit 200 and the first emitting unit 400 so as to be in communication with the first receiving unit 200 and the first emitting unit 400. It should be noted that, although a single transceiver 840 is used for illustration here, the transceiver 840 is not limited to be implemented using a single device, and the transceiver 840 may also be implemented using a receiver and an emitter which are independent from each other. In some embodiments, the mobile mechanism 814 may be implemented using a driver (such as an engine or a motor) in connection with a transmission assembly (such as a wheel and a shaft, or a continuous track (caterpillar track) and a gear). In some embodiments, the driver is connected to the controller 820 and is enabled by the controller 820. The transmission assembly is coupled to and driven by the driver.

Please refer to FIG. 1 and FIG. 11. After the central control mainframe 110 confirms that the transportation platform 710 has been moved to the correct location, the central control mainframe 110 can further perform the monitoring procedure of the mobile vehicle 800 (the step S109 through the step S113). When the monitoring procedure of the mobile vehicle 800 (the step S109 through the step S113) is performed, the processor 300 generates a second motion command according to the completion signal, wherein the second motion command indicates a path (the step S109), and transmits the second motion command to the mobile vehicle 800 through the first emitting unit 400 (the step S110). The controller 820 of the mobile vehicle 800 receives the second motion command through the controller 820. Then, the controller 820 will control the mobile mechanism 814 of the vehicle body 810 in response to the second motion command, so that the mobile mechanism 814 performs a displacement of the path (the step S111), and thus the mobile vehicle 800 is actuated to move along the path. When the mobile vehicle 800 reaches the end of the path, the positioning module 830 of the mobile vehicle 800 will generate activity information which indicates the location of the mobile vehicle 800 (the step S112). In other words, the positioning module 830 generates the activity information by sensing the current location of the mobile vehicle 800. Next, the controller 820 then transmits the activity information generated by the positioning module 830 to the central control mainframe 110 through the transceiver 840.

Now, the processor 300 of the central control mainframe 110 receives the activity information which indicates the location of the mobile vehicle 800 through the first receiving unit 200 (the step S113) and confirms the current location of the mobile vehicle 800 through the activity information. In an exemplary embodiment, the processor 300 can learn the current location of the mobile vehicle 800 through the activity information and confirm whether the current location is the end of the path indicated by the second motion command, and therefore the processor 300 can determine whether the mobile vehicle 800 has moved to the correct location. If the processor 300 learns from the activity information that the current location of the mobile vehicle 800 conforms to the end of the path indicated by the second motion command, the processor 300 determines that the mobile vehicle 800 has moved to the correct location. If the processor 300 learns from the activity information that the current location of the mobile vehicle 800 does not conform to the end of the path indicated by the second motion command, the processor 300 determines that the mobile vehicle 800 has not moved to the correct location.

In an exemplary embodiment, when that the mobile vehicle 800 has not moved to the correct location is determined, the step S109 through the step S113 may be repeatedly executed until the processor 300 determines that the mobile vehicle 800 has moved to the correct location. In another exemplary embodiment, when that the mobile vehicle 800 has not moved to the correct location is determined, the processor 300 may transmit an event notification to notify a user of an abnormality of the mobile vehicle 800. Besides, after the user resolved the abnormal event, the step S109 through the step S113 may be executed again, until the processor 300 determines that the mobile vehicle 800 has moved to the correct location. In yet another exemplary embodiment, the mobile vehicle 800 may be operated in a manner in which the activity information is regularly returned to the processor 300. Now, when that the mobile vehicle 800 has not moved to the correct location is determined, the processor 300 may perform no action or merely record the received activity information and then wait to receive the next activity information returned by the mobile vehicle 800.

In some embodiments, when that the mobile vehicle 800 has moved to the correct location is determined, the processor 300 may transmit the next motion command to successively perform the next monitoring procedure.

For example, referring to FIG. 1 and FIG. 3, continuing from the previous embodiment, after the monitoring procedure of the transportation device 700 (the step S101 through the step S108) is completed, the side 711a of the transportation platform 710 is connected to the internal bottom surface 522A of the truck 500A. Next, the transportation control system 100 can execute the monitoring procedure of the mobile vehicle 800 (the step S109 through the step S113) so that the mobile vehicle 800 on the transportation platform 710 leaves from the side 711a of the transportation platform 710 in response to the second motion command and thus enters the container 510A of the truck 500A. Similarly, the transportation control system 100 can also execute the monitoring procedure of the mobile vehicle 800 (the step S109 through the step S113), so that the mobile vehicle 800 in the container 510A of the truck 500A leaves the container 510A of the truck 500A and thus moves onto the transportation platform 710 or moves to and fro between the dock and the container 510A of the truck 500A through the transportation device 700.

In this way, according to one or some embodiments, the transportation control system 100 can sense an error distance between the transportation platform 710 and the target object 500/600 and automatically control the transportation platform 710 to move by a corresponding distance according to the error distance between the transportation platform 710 and the target object 500/600. Therefore, the error distance between the transportation platform 710 and the plane 522/622 of the target object 500/600 is minimized, so that the mobile vehicle 800 is allowed to smoothly move between the two planes 522, 622. Consequently, the mobile vehicle 800 is utilized to carry a designated object from one of the target objects 500/600 to the other one of the target objects 500/600, such as: performing loading and unloading of goods.

In some embodiments, the activity information can indicate not only the location of the mobile vehicle 800 but also an activity state of the mobile vehicle 800. Therefore, the central control mainframe 110 can further use the activity information from the mobile vehicle 800 to confirm the activity state of the mobile vehicle 800 so as to automatically adjust the second motion command in a real-time manner. In this embodiment, the activity state may be but not limited to a moving speed of the mobile vehicle 800, a loading of the mobile vehicle 800, a time-varying location of the mobile vehicle 800, or any combination thereof. In an exemplary embodiment, after the step S112, the controller 820 transmits the activity information generated by the positioning module 830 and the activity state which represents the mobile vehicle 800 (obtained from another element) to the central control mainframe 110 through the transceiver 840. For example, the activity state may be the speed of the mobile vehicle 800 obtained from the vehicle body 810 or the current loading of the mobile vehicle 800 obtained from a pressure-sensitive device (not shown). In another exemplary embodiment, in the step S111, during the process of the mobile vehicle 800 moving, the controller 820 regularly obtains from the positioning module 830 the activity information which indicates the current location of the mobile vehicle 800 and transmits the activity information to the central mainframe 110 through the transceiver 840 so as the record an actual moving path of the mobile vehicle 800.

In some embodiments, the central control mainframe 110 can also alternately monitor the mobile vehicle 800 and the transportation device 700, so that the mobile vehicle 800 moves between the two planes 522, 622 through the transportation device 700, as shown in FIG. 3. In other words, in some embodiments, the transportation device 700 is used to bridge the two target objects 500, 600, and the mobile vehicle 800 can travel through the transportation device 700 and thus move from one target object 500/600 to the other target object 500/600.

For example, referring to FIG. 1 and FIG. 3, continuing the previous embodiment, when the transportation platform 710 is connected with the floor 622A of the stopping station 600A, the transportation control system 100 can execute the monitoring procedure of the mobile vehicle 800 (the step S109 through the step S113) to control the mobile vehicle 800 on the floor 622A to move onto the transportation platform 710. Next, the transportation control system 100 then execute the monitoring procedure of the transportation device 700 (the step S101 through the step S108) to control the transportation platform 710 to move the platform body 711 and the mobile vehicle 800 on the platform body 711 to approach the container 510A of the truck 500A, until the side 711a of the platform body 711 is connected to the internal bottom surface 522A of the container 510A of the truck 500A. Then, the transportation control system 100 executes the monitoring procedure of the mobile vehicle 800 (the step S109 through the step S113) to control the mobile vehicle 800 on the transportation platform 710 to move into the container 510A of the truck 500A. Besides, the transportation control system 100 can then sequentially execute the monitoring procedure of the mobile vehicle 800 (the step S109 through the step S113), the monitoring procedure of the transportation device 700 (the step S101 through the step S108), and the monitoring procedure of the mobile vehicle 800 (the step S109 through the step S113), so that the mobile vehicle 800 in the container 510A of the truck 500A moves onto the transportation platform 710 and then moves from the transportation platform 710 onto the floor 622A of the stopping station 600A.

Figure 2:
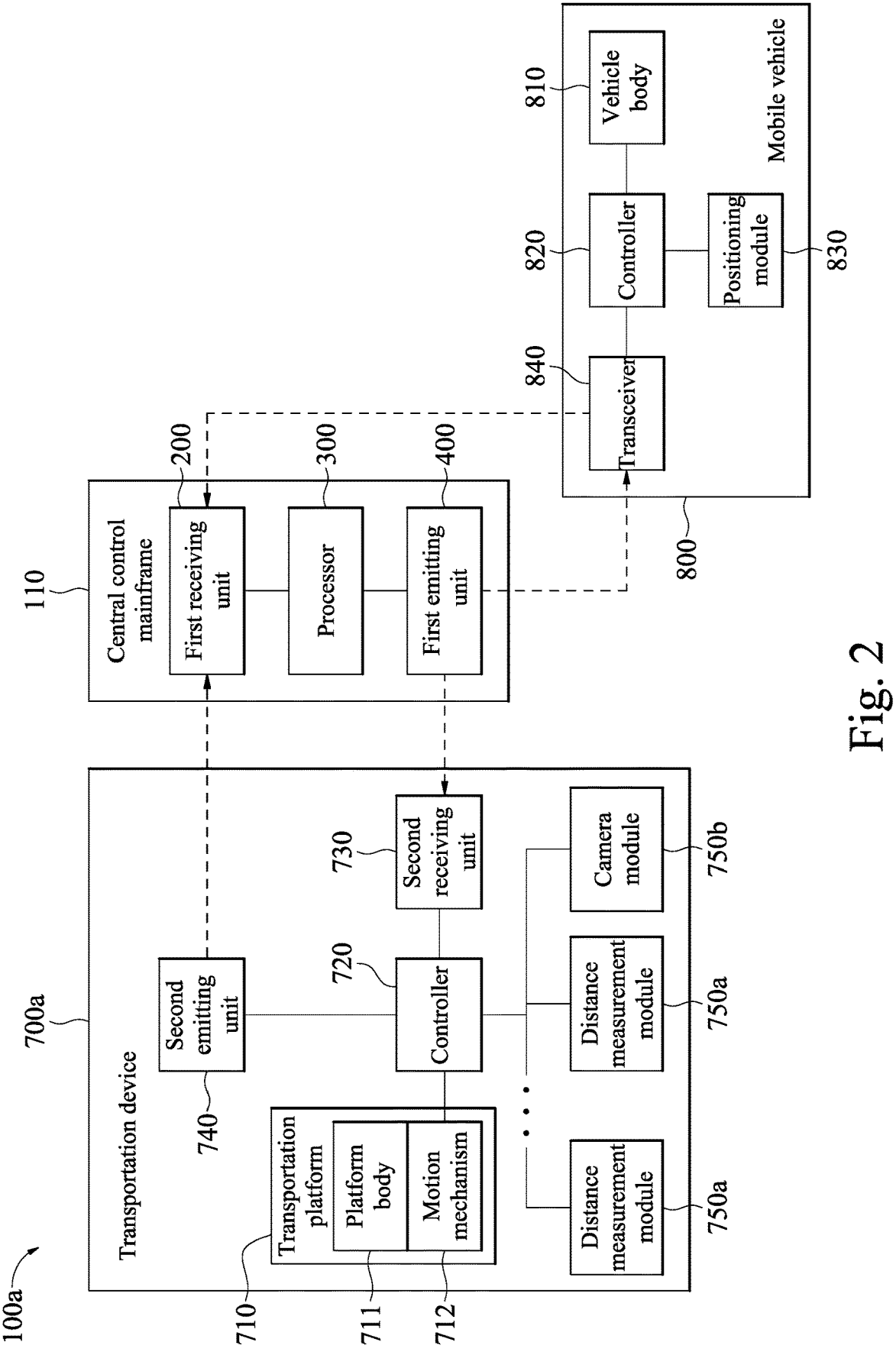
FIG. 2 illustrates a schematic block diagram of a transportation control system according to a second embodiment of the instant disclosure.

In some embodiments, referring to FIG. 2, FIG. 3, and FIG. 5, the location sensing modules 750 of the transportation device 700a of the transportation control system 100a may comprise multiple distance measurement modules 750a and one or more camera modules 750b. The following will illustrate using the example with two distance measurement modules 750a and two camera modules 750b, but the numbers of these elements are not limited in the instant disclosure. In other words, in some embodiments, the number of the distance measurement modules 750a and the number of the camera modules 750b may be adjusted to other numbers according to actual demands (such as demands of factors of cost, convenience of assembly, space for installment, precision, or any combination thereof).

The distance measurement modules 750a and the camera modules 750b are disposed at a lower edge of the side 711a of the platform body 711 of the transportation device 700, and sensing surfaces of the distance measurement modules 750a and sensing surfaces of the camera modules 750b all face toward a side which is opposite to the platform body 711. In other words, in some embodiments, the sensing surfaces of the distance measurement modules 750a and the platform body 711 are on opposite sides of the body of the distance measurement modules 750a, respectively, and the sensing surfaces of the camera modules 750b and the platform body 711 are on opposite sides of the body of the camera modules 750b, respectively. In some embodiments, the side 711a of the platform body 711 refers to a side of the platform body 711 adjacent to the target object 500 when the target object 500 is stopped next to the platform body 711. For example, referring to FIG. 3, a bottom side of the side 711a of the platform body 711 of the transportation device 700 adjacent to the truck 500A is provided with multiple distance measurement modules 750a and multiple camera modules 750b.

In some embodiments, the location sensing modules 750 may be divided into two parts to be respectively disposed at two corners of the side 711a of the platform body 711, as shown in FIG. 5. For example, referring to FIG. 5, a set of location sensing module 750 consisting of the distance measurement module 750a and the camera module 750b is disposed at a lower edge of one of two ends of the side 711a of the platform body 711, and the other set of location sensing module 750 consisting of the other distance measurement module 750a and the other camera module 750b is disposed at a lower edge of the other end of the side 711a of the platform body 711.

Figure 12:
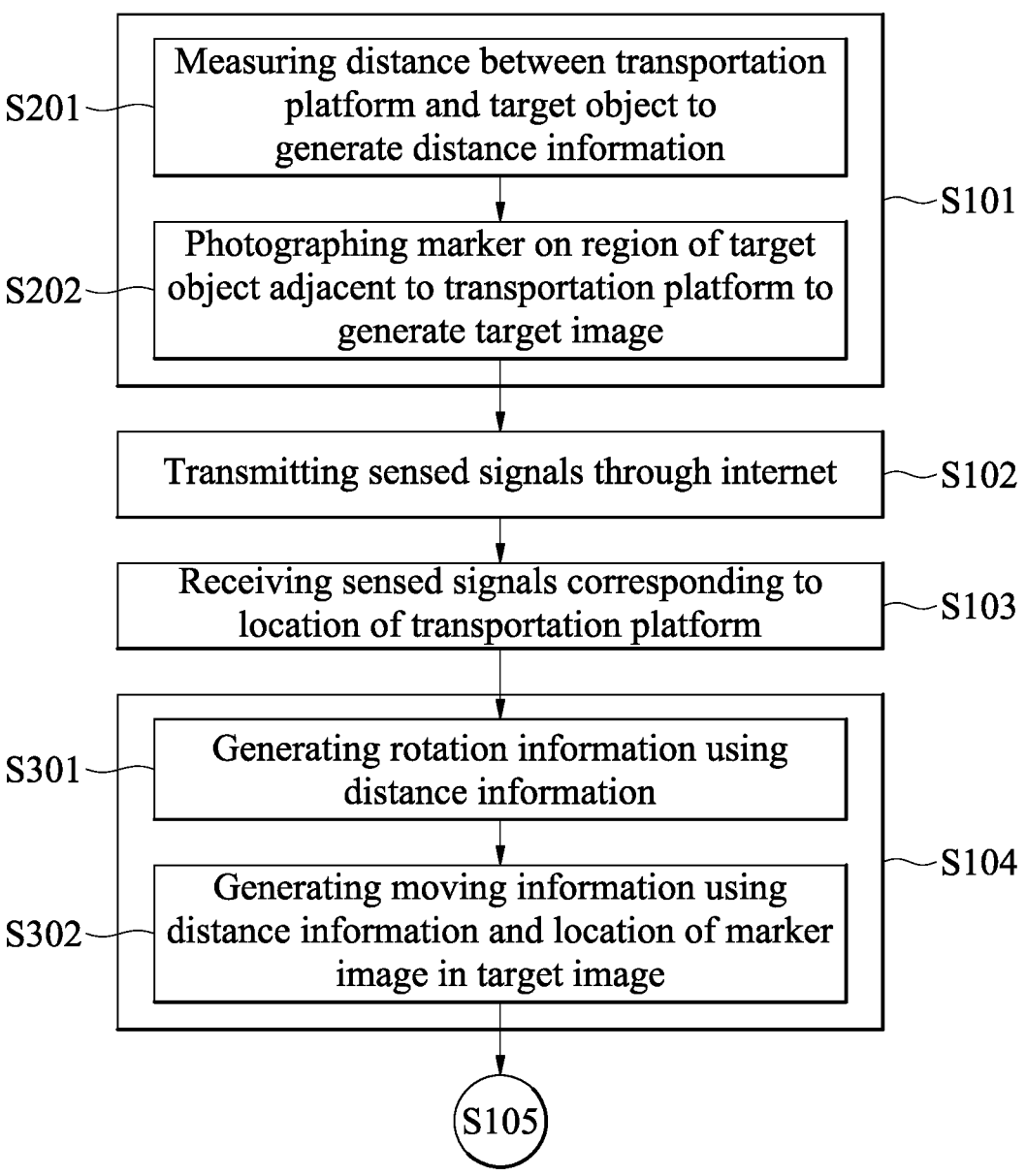
FIG. 12 illustrates a partial flow chart of a first exemplary implementation of the transportation control method shown in FIG. 11.

Please refer to FIG. 2, FIG. 3, and FIG. 12. In some embodiments, the location sensing modules 750 comprise multiple distance measurement modules 750a and one or more camera modules 750b. Now, the sensed signals generated by the location sensing modules 750 comprise the distance information generated by the distance measurement modules 750a and the target images generated by the camera modules 750b. In this embodiment, a side of the target object 500 adjacent to the transportation platform 710 has one or more markers 900, as shown in FIG. 4. Specifically, referring to FIG. 3, FIG. 4, and FIG. 5, in some embodiments, the markers 900 correspond to the camera modules 750b in a one-to-one correspondence. A region of the target object 500 adjacent to the transportation platform 710 is provided with a corresponding one of markers 900 in correspondence to the location of each of the camera modules 750b. In some embodiments, each of the markers 900 may be but not limited to a pattern, a text, or a symbol. For example, the marker 900 may be a triangular pattern below a backdoor of the container 510A of the truck 500A, as shown in FIG. 5, but the shape is not limited thereto.

Now, referring to FIG. 2, FIG. 3, FIG. 4, FIG. 5, and FIG. 12, in some embodiments of the step S101, each of the distance measurement modules 750a measures the distance between the transportation platform 710 and the target object 500 to generate distance information (i.e., the sensed signal generated by the distance measurement module 750a) which indicates this distance (the step S201). Besides, each of the camera modules 750b photographs a corresponding one of the markers 900 from the transportation platform 710 to generate the target image (i.e., the sensed signal generated by the camera module 750b) (the step S202). Therefore, the target image generated by each of the camera modules 750b includes a marker image of the corresponding marker 900. Next, in the step S104, the processor 300 uses the distance information to generate the rotation information θp, θr, θy in the location difference (the step S301) and uses the distance information and the location of the marker image in the target image to generate the translation information Dfb, Drf and the lift information H in the location difference through image processing (the step S302).

In some embodiments, taking the example with two distance measurement modules 750a, in the step S301, the processor 300 obtains data of straight distances between the two ends of the side 711a of the transportation platform 710 and the target object 500 (i.e., the distance information) through the measured values of the distance measurement modules 750a, and the processor 300 compares the two data to confirm whether the difference between the two data is larger than a tolerance value (such as but not limited 0, i.e., when the two data are identical). In some embodiments, that the difference is larger than the tolerance value indicates that a yaw exists between the transportation platform 710 and the target object 500. On the other hand, that the difference is not larger than the tolerance value indicates that the yaw does not exist between the transportation platform 710 and the target object 500. Therefore, when the difference is larger than the tolerance value (such as when the two data are not identical), the processor 300 generates the rotation direction according to the values of the two data and generates the rotation angle (yaw) according to the difference between the two data so as to obtain the rotation information θy which contains the rotation direction and the rotation angle (yaw). On the other hand, when the difference is not larger than the tolerance value (such as when the two data are identical), the processor 300 generates the rotation information θy which contains the rotation angle of 0.

For example, taking an example where one of the two data is larger and the other of the two data is smaller, the rotation direction is generated to indicate a rotation in which the rotation axis is a central axis perpendicular to the surface of the transportation platform 710, and the rotation direction is from the end where the larger data is measured to the end where the smaller data is measured, while the rotation angle is obtained by performing calculation on the difference between the two data and a length of the side 711a using an algorithm. In another exemplary embodiment, the processor 300 may also merely generate the rotation direction (i.e., the rotation information θy) according to the values of the two data without generating the rotation angle (yaw). Instead, the step S101 through the step S104 are repeatedly executed during the process when the transportation platform 710 rotates toward the rotation direction (the step S107), until the processor 300 confirms that the distance information measured by the two distance measurement modules 750a is identical. In other words, in some embodiments, the processor 300 determines that the execution of the step S107 is completed through continuously obtaining the distance information. In this embodiment, the distance information having identical data can be seen as the completion signal.

In some embodiments, taking the example with two distance measurement modules 750a, in the step S302, the processor 300 can further determine whether the transportation platform 710 should translate toward the target object 500 by comparing the two data. In some embodiments, that the two data are identical indicates that the transportation platform 710 does not need to translate toward the target object 500; in other words, the processor 300 will generate the translation information Dfb with a translation amount of 0. An algorithm can be used to perform calculation on the difference between the two data to obtain a translation amount, so that the distance between the side 711a of the transportation platform 710 and the target object 500 becomes 0. Therefore, the translation information Dfb containing the translation direction toward the target object 500 and the translation amount can be obtained.

Besides, after the processor 300 obtains the target images based on the sensed signals, the processor 300 can perform marginalization processing on the target images and then locate the marker images in the target images through edge analysis. Therefore, the locations of the marker images in the target images can be obtained. In the step S302, the processor 300 compares the obtained location with a target location to determine whether the transportation platform 710 should move vertically and what the lift direction is. Then, the processor 300 generates the vertical movement amount according to the height difference between the obtained location and the target location to obtain the lift information H which contains the lift direction and the vertical movement amount. In this embodiment, the target location has been set in advance and stored in the central control mainframe 110. In some embodiments, the target location can be obtained through the target images which were photographed when the platform body 711 of the transportation platform 710 is connected to the target object 500. For example, the location of the marker images in the target images which were photographed when the platform body 711 of the transportation platform 710 is connected to the target object 500 may be taken as the target location.

In some embodiments, the distance measurement modules 750a are multiple infrared sensors, multiple sonar sensors, or any combination thereof.

Specifically, referring to FIG. 2 through FIG. 5 and FIG. 12, in some embodiments, the distance measurement modules 750a disposed at different locations on the platform body 711 respectively use infrared rays or sonar (or other ways able to measure a distance) to sense the distance of the target object 500 so as to obtain the corresponding distance information. In some embodiments, each of the camera modules 750b may be implemented using a combination of lenses and photosensitive elements or a combination of lenses, photosensitive elements, and a digital image processor. In some embodiments, the photosensitive element may be a charge-coupled device (CCD), a complementary metal-oxide semiconductor (CMOS), or the like.

Figure 6:
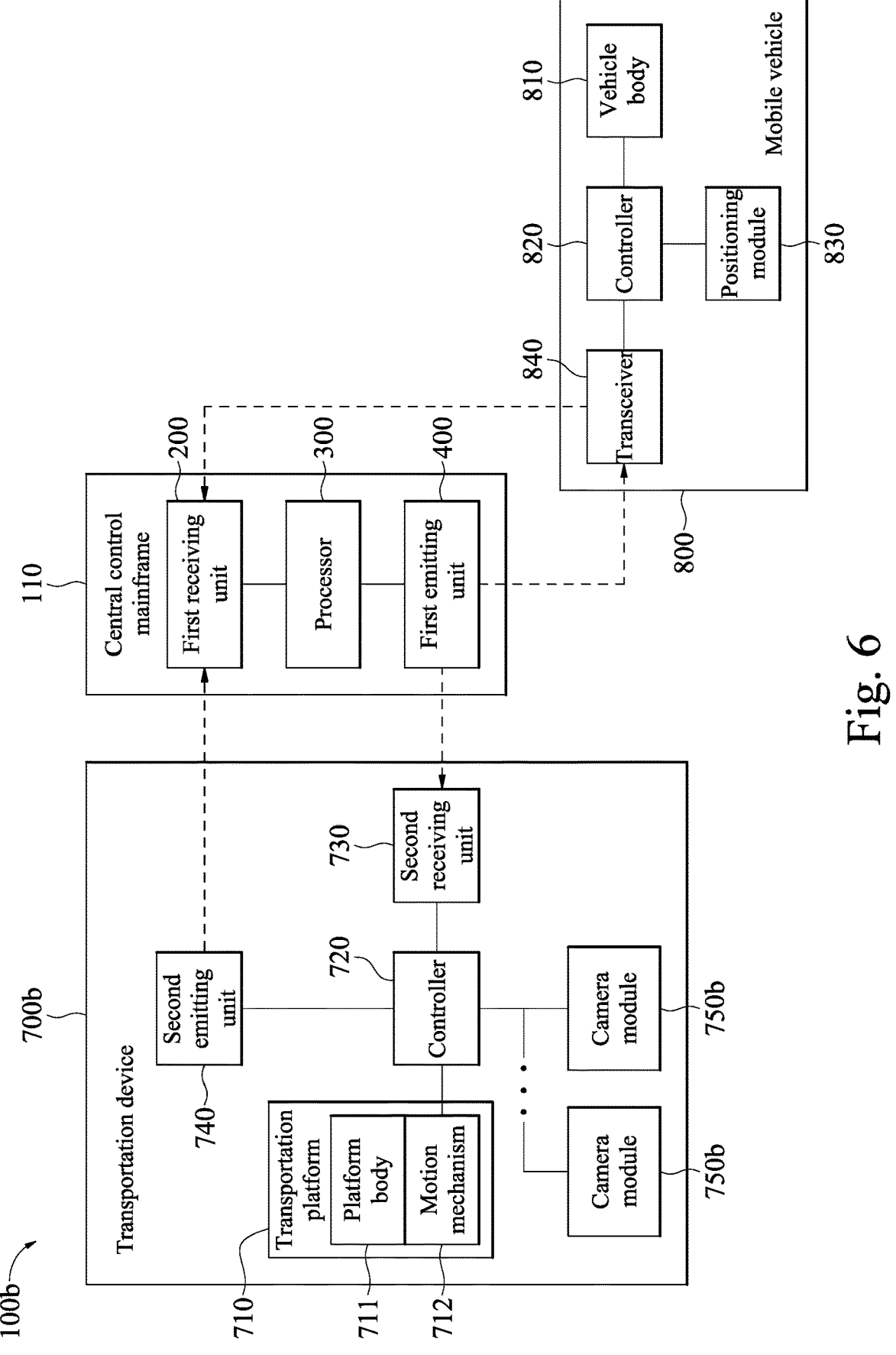
FIG. 6 illustrates a schematic block diagram of a transportation control system according to a third embodiment of the instant disclosure.

In some embodiments, referring to FIG. 3 and FIG. 6, the location sensing modules 750 of the transportation device 700b of the transportation control system 100b may merely keep the one or more camera modules 750b, i.e., the location sensing modules 750 do not include the distance measurement modules 750a. In these embodiments, the locations of the camera modules 750b and the relationships between the camera modules 750b and the other elements are identical to those in the previous embodiments and therefore will not be repeated here.

Please refer to FIG. 3, FIG. 6, and FIG. 13. In some embodiments, after the processor 300 receives the sensed signals (the step S103), the processor 300 can obtain, from the sensed signals, the target images generated by the camera modules 750b. Next, in the step S104, the processor 300 uses the locations of the marker images in the target images to generate the translation information Dfb, Drf, the lift information H, and the rotation information θp, θr, θy (the step S401).

In some embodiments, the processor 300 may also analyze an image distance between a platform image and a target object image in the target image to generate the location difference. Please refer to FIG. 3 and FIG. 7. The location sensing modules 750 comprise one or more camera modules 750b. The camera modules 750b are disposed at the periphery of the transportation platform 710, and thus a preset distance is between the camera modules 750b and the transportation platform 710, while the sensing surfaces of the camera modules 750b face toward the side 711a of the transportation platform 710, as shown in FIG. 7. In an exemplary embodiment, the camera modules 750b may be disposed directly above the side 711a of the transportation platform 710. In another embodiment, the camera modules 750b may also be disposed at the left side or the right side of the transportation platform 710 and on an extension line of the side 711a of the transportation platform 710, or on a location where the camera modules 750b can focus on a field of view which covers the side 711a of the transportation platform 710.

In an exemplary embodiment, the camera modules 750b can transmit signals to the transportation platform 710 through wiring and thus be connected to the controller 720 which is disposed on the transportation platform 710. Consequently, the target images (i.e., the sensed signals) generated by the camera modules 750b can thus be transmitted to the central control mainframe 110 by the controller 720 through the second emitting unit 740. In another exemplary embodiment, the transportation device 700 may be additionally provided with another emitting unit (i.e., another second emitting unit 740) (not shown). This another second emitting unit 740 is integrated on the camera modules 750b and configured to transmit the target images (i.e., the sensed signals) generated by the camera modules 750b to the central control mainframe 110.

Figure 14:
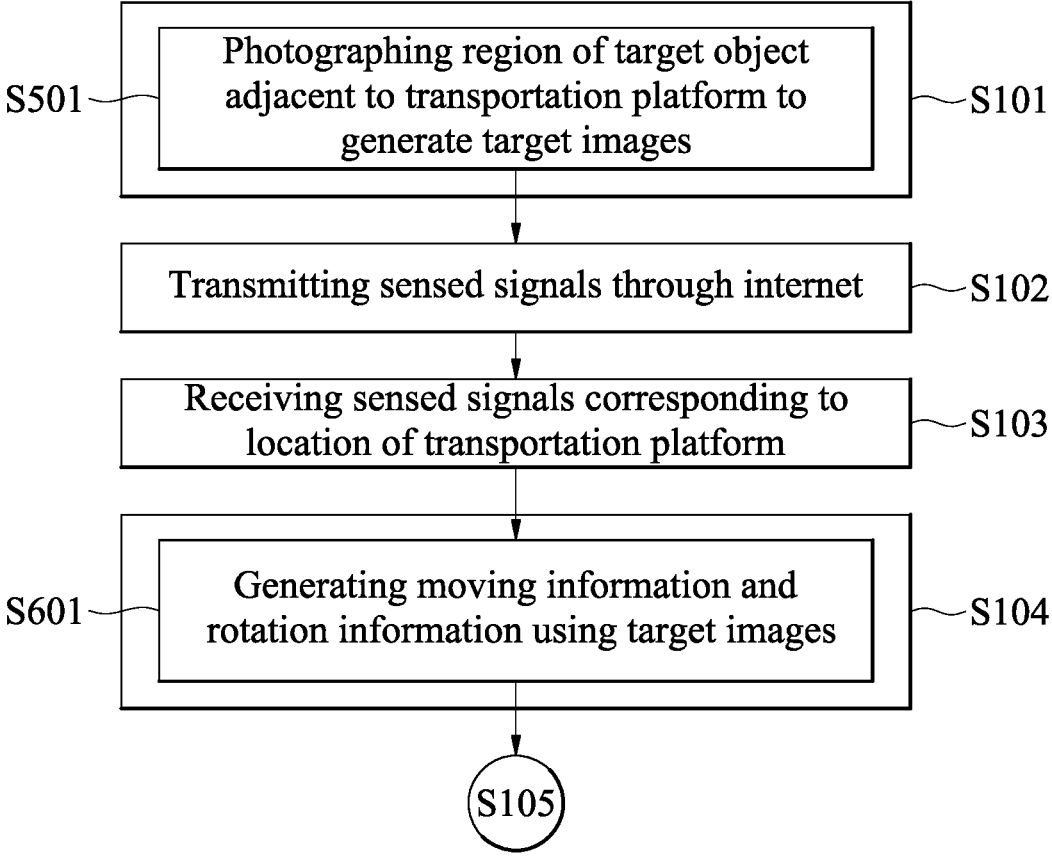
FIG. 14 illustrates a partial flow chart of a third exemplary implementation of the transportation control method shown in FIG. 11.

In some embodiments, referring to FIG. 3, FIG. 7, and FIG. 14, the camera modules 750b photograph regions of the target object 500 adjacent to the transportation platform 710 from different sensing locations to generate multiple target images (the step S501). In this embodiment, each of the target images includes two edge images of adjacent edges of the target object 500 and the transportation platform 710. In other words, in this embodiment, the two edge images are the image of the plane 522 of the target object 500 adjacent to a side (such as the side 711a) of the transportation platform 710 and the image of the side 711a of the transportation platform 710. After the processor 300 receives the sensed signals (the step S103), the processor 300 can obtain the target images generated by the camera modules 750b from the sensed signals, and the processor 300 can use the target images to generate the translation information Dfb, Drf, the lift information H, and the rotation information θp, θr, θy through image processing (the step S601).

In some embodiments, after the processor 300 obtains the target images based on the sensed signals, the processor 300 can perform marginalization processing on the target images and then locate the marker images in the target images through edge analysis.

For example, two camera modules 750b may be disposed at the periphery of the transportation platform 710, and thus a preset distance is between each of the camera modules 750b and the transportation platform 710. One of the camera modules 750b may photograph the adjacent regions of the transportation platform 710 and the target object 500 from top to bottom (in a direction perpendicular to the plane 622 or the transportation platform 710) to generate the target image, while the other one of the camera modules 750b may photograph the adjacent regions of the transportation platform 710 and the target object 500 from a side of the adjacent regions of the transportation platform 710 and the target object 500 to generate the target image. The processor 300 can determine whether the target object 500 has been connected to the transportation platform 710 according to a parallel image distance between two the ends of the edge image of the transportation platform 710 and the edge image of the target object 500 in the target image generated from top to bottom. In this embodiment, the parallel image distance is for example the number of pixels of two lines between the edge image of the side 711a and the edge image of a side of the plane 522 of the target object 500, wherein the two lines here are extension lines of the edge images of the two sides connected to the two ends of the side 711a. Consequently, the processor 300 obtains the translation amount, rotation direction, and rotation angle (yaw) toward the target object 500 according to the values of the two parallel image distances. Then, the processor 300 can thus generate the rotation information θy containing the rotation direction and rotation angle and generate the translation information Dfb containing the translation amount toward the target object 500. The processor 300 can determine whether the plane 522 of the target object 500 is on the same height as the side 711a of the transportation platform 710 according to a height difference between the edge image of the side 711a of the transportation platform 710 and the edge image of the plane 522 of the target object 500 in the target image generated from the sides of the transportation platform 710 and the target object 500, wherein the edge image of the plane 522 of the target object 500 is adjacent to the side 711a of the transportation platform 710. Accordingly, the processor 300 can use the height difference to generate the vertical movement amount of the platform body 711 toward the target object 500 and thus generate the lift information H containing the vertical movement amount toward the target object 500.

In some embodiments, the transportation platform 710 may be an N degree-of-freedom platform or other adjustable platforms. Here, N is a positive integer. The N degree-of-freedom platform may be for example, a 1 degree-of-freedom platform, a 2 degree-of-freedom platform, a 3 degree-of-freedom platform, a 4 degree-of-freedom platform, a 5 degree-of-freedom platform, a 6 degree-of-freedom platform, or a motion platform with more degrees of freedom. In other words, in some embodiments, the number of degree-of-freedom of the motion platform of the transportation platform 710 may be selected to be equal to the examples above or more according to the number of adjustment directions. Each of the adjustment directions may be up-down, left-right, pitch, yaw, roll, etc.

Please refer to FIG. 5. In some embodiments, the motion mechanism 712 is multiple electric cylinders, and one end of each of the electric cylinders is coupled to the platform body 711. The controller 720 can control the lifting of each of the electric cylinders in order to adjust the location of the platform body 711 by the location difference. The number of the electric cylinders may be determined according to actual demands. For example, the number of the electric cylinder may be 6, so that the transportation platform 710 is a 6 degree-of-freedom platform, as shown in FIG. 5.

Figure 8:
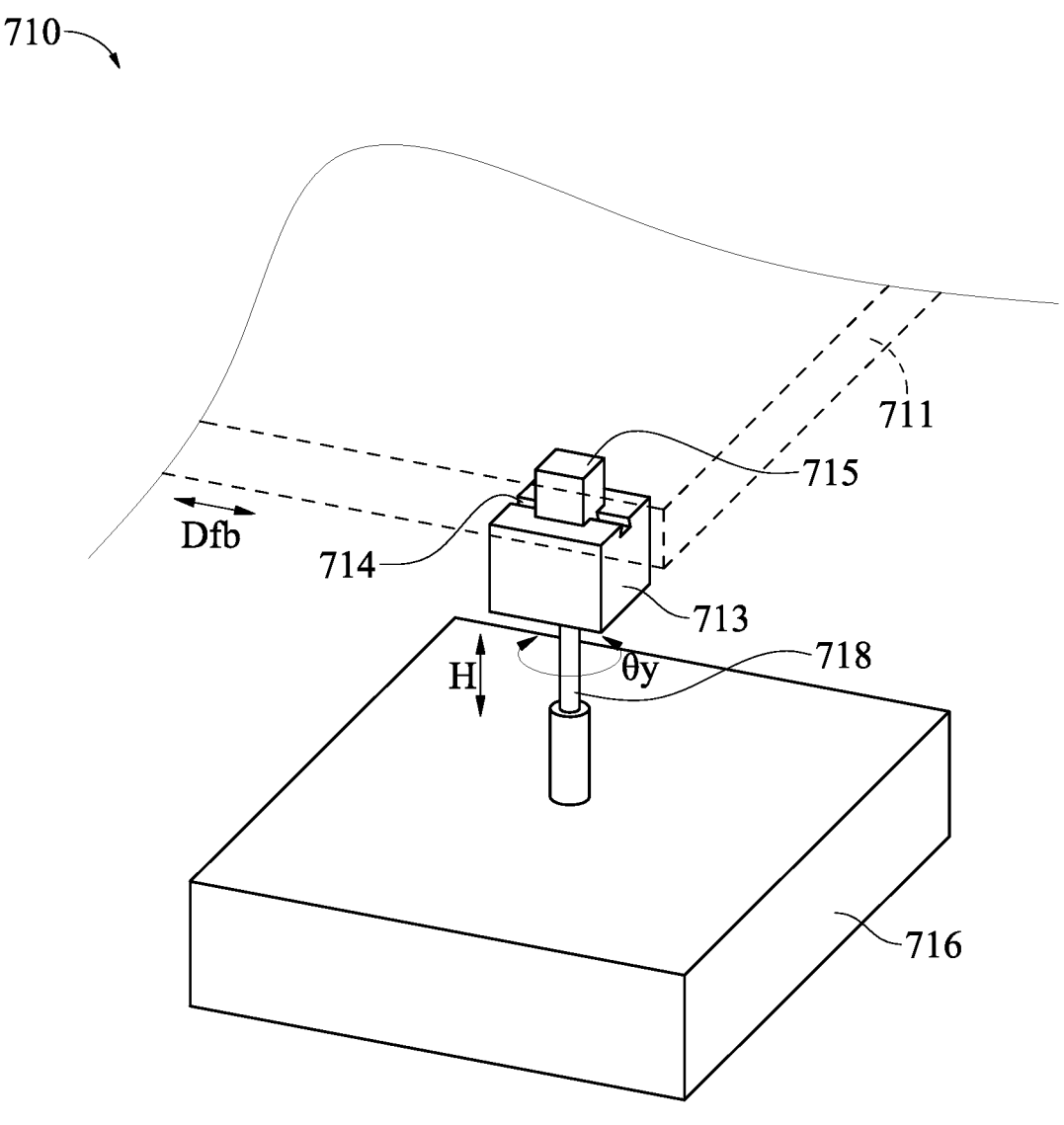
FIG. 8 illustrates a schematic perspective view of an exemplary implementation of the transportation platform shown in FIG. 1, FIG. 2, or FIG. 6.

Please refer to FIG. 8 and FIG. 9. In some embodiments, the motion mechanism 712 comprises a connection body 713, a slide rail 714, a sliding portion 715, a support body 716, and a support rod 718. The slide rail 714 is on a top surface of the connection body 713. The sliding portion 715 is fixed at a bottom surface of the platform body 711 and slidably connected to the slide rail 714. The support body 716 has a connection portion 717. The support rod 718 is matched with the connection portion 717. One of the support body 716 and the support rod 718 is coupled to the bottom surface of the connection body 713. In this embodiment, the transportation platform 710 has 4 degrees of freedom. In some embodiments, the connection portion 717 may be but not limited to a slot, a convex, or a bolt-lock device.

In some embodiments of the step S107, taking the example where the location difference comprises the translation information Dfb, the lift information H, and the rotation information θy, the controller 720 will control the support rod 718 and the support body 716 according to the first motion command so that the support rod 718 and the support body 716 relatively extend/retract by the lift information H and relatively rotate by the rotation information θy, and the controller 720 controls the sliding portion 715 according to the first motion command so that the sliding portion 715 slides by the translation information Dfb in relation to the slide rail 714.

In some embodiments, the positioning module 830 can use a preset marker (such as but not limited a barcode, a pattern, a text, a symbol or other types of markers) to obtain the activity information. Here, the positioning module 830 may be but not limited to a barcode scanner or a camera module.

Specifically, in some embodiments, one or more designated locations will be provided on a path on which the mobile vehicle 800 is preset to travel, so that when the mobile vehicle 800 moves to any of the designated locations, the positioning module 830 can scan the marker on the path. Therefore, that the designated location has been reached can be learned, and the activity information can be obtained. Each of the designated locations is a location on the path where the mobile vehicle 800 should stay and wait until another operation has been executed according to the application scenario, and each of the designated locations corresponds to the sensing surface of the positioning module 830. In some embodiments, the markers contain the activity information, so that the positioning module 830 can scan and decode the markers to generate the activity information.

For example, the user may provide a barcode at the end of the path in advance and use a barcode scanner as the positioning module 830. Now, during the process of the mobile vehicle 800 moving, the barcode scanner will continuously scan the road (the step S111). In some embodiments, when the barcode scanner scans the barcode, it indicates that the mobile vehicle 800 has moved to the designated location; in other words, when the mobile vehicle 800 reaches the end of the path, the barcode scanner of the mobile vehicle 800 will be aligned with the barcode on the path and will thus scan and decode the barcode on the path to obtain the activity information (the step S112).

In some embodiments, the positioning module 830 also utilizes a wireless signal to obtain the activity information.

Here, the positioning module 830 may be a coordinate positioning device, and the coordinate positioning device may be but not limited to a global positioning system (GPS), a BeiDou positioning device, a location based service (LBS) positioning device, a Wi-Fi positioning device, an RFID positioning device, or a Bluetooth positioning device.

For example, assume that the global positioning system is used as the positioning module 830. Now, in the step S112, when the mobile vehicle 800 reaches the end of the path, the global positioning system on the mobile vehicle 800 can sense a wireless satellite signal to generate a positioning coordinate of the current location (i.e., the end of the path) (i.e., record the activity information of the coordinate of the mobile vehicle 800). Then, the controller 820 transmits the positioning coordinate to the central control mainframe 110 through the transceiver 840, so that the central control mainframe 110 learns, through the positioning coordinate, that the mobile vehicle 800 has reached the end of the path.

For example, referring to FIG. 2 through FIG. 5, take the example of an application scenario where the goods are to be unloaded from the truck 500A to the stopping station 600A. In this scenario, the target object 500 is the truck 500A, the location sensing modules 750 are two infrared sensors (i.e., the distance measurement modules 750*a*) and two camera modules 750*b*, the mobile vehicle 800 is the automated guided vehicle, and the positioning module 830 is the barcode scanner. An initial location of the transportation platform 710 is that the side 711*b* is connected to the floor 622A of the stopping station 600A. In other words, the upper surface of the platform body 711 is aligned with the floor 622A. Besides, a positioning barcode is adhered to each of the upper surface of the transportation platform 710 and the internal bottom surface 522A under a rack inside the container 510A of the truck 500A.

When the truck 500A reaches the stopping station 600A, the central control mainframe 110 controls a rolling door or a gate (if any) of the warehouse on the stopping station 600A to be opened. After the rolling door or the gate has been opened, the central control mainframe 110 performs the monitoring procedure of the mobile vehicle 800 (the step S109 through the step S113), so that the mobile vehicle 800 comes out from the warehouse to the stopping station 600A and then moves onto the transportation platform 710. When the mobile vehicle 800 scans the positioning barcode on the transportation platform 710, it indicates that the mobile vehicle 800 has reached the transportation platform 710. Now, the mobile vehicle 800 scans the positioning barcode to obtain the activity information and then returns the activity information to the central control mainframe 110. After the central control mainframe 110 receives the activity information, the central control mainframe 110 then performs the monitoring procedure of the transportation device 700 (the step S101 through the step S108), so that the side 711*a* of the transportation platform 710 is connected to the internal bottom surface 522A of the truck 500A, and then the central control mainframe 110 notifies the truck 500A to open the door of the container 510A. After the central control mainframe 110 receives the returned completion signal, the central control mainframe 110 once again performs the monitoring procedure of the mobile vehicle 800 (the step S109 through the step S113), so that the mobile vehicle 800 moves from the transportation platform 710 to the interior of the container 510A of the truck 500A. When the mobile vehicle 800 scans the positioning barcode in the container 510A, the mobile vehicle 800 can then determine that the mobile vehicle 800 has reached below the rack and then lift the rack carrying the goods. Then, the mobile vehicle 800 carries the rack carrying the goods and moves in reverse onto the transportation platform 710. Similarly, when the mobile vehicle 800 returns to the transportation platform 710, the mobile vehicle 800 will scan the positioning barcode on the transportation platform 710 to obtain and return the activity information to the central control mainframe 110. Now, the central control mainframe 110 then notifies the transportation device 700 to return the transportation platform 710 to the initial location, i.e., connected to the stopping station 600A. Finally, the central control mainframe 110 notifies the mobile vehicle 800 to move the rack to a designated unloading location of the stopping station 600A.

As above, the transportation control system 100, the transportation device 700, and the transportation control method according to any of the embodiments can provide automated transportation between two platforms which are not interconnected and can automatically calibrate the connection between the transportation platform 710 and the other platform. In some embodiments, the transportation control system 100 or the transportation control method can further control the timing of movement of the mobile vehicle 800, so that the mobile vehicle 800 moves between the two platforms. For example, the transportation control system 100 or the transportation control method can control the timing of movement of the mobile vehicle 800 so as to replace goods transportation between two platforms using manual labor, so that operational errors can be avoided.

Although the technical contents of the instant disclosure has been disclosed as above with the preferred embodiments, the embodiments are not meant to limit the instant disclosure. Any modification and polishing done by any person skilled in the art without deviating from the spirit of the instant disclosure shall all be covered by the scope of the instant disclosure. Therefore, the scope of protection of the instant disclosure shall be determined by the definition according to the accompanying claims.

What is claimed is:

1. A transportation control system comprising:
at least one location sensing module configured to generate at least one sensed signal
a first receiving unit configured to receive the at least one sensed signal;
a processor coupled to the first receiving unit and configured to generate a first motion command according to the at least one sensed signal;
a first emitting unit coupled to the processor and configured to transmit the first motion command;
a transportation platform;
a second receiving unit on the transportation platform and configured to be wirelessly connected to the first emitting unit;
a controller on the transportation platform and configured to receive the first motion command from the first emitting unit through the second receiving unit and execute the first motion command so as to control the transportation platform; and
a second emitting unit coupled to the at least one location sensing module and configured to be wirelessly connected to the first receiving unit so as to transmit the at least one sensed signal to the first receiving unit.

2. The transportation control system according to claim 1, wherein the at least one sensed signal comprises at least one distance information and a target image, the processor generates a location difference according to the at least one sensed signal, and the processor generates the first motion command according to the location difference; the location difference comprises a moving information and a rotation information, and the at least one location sensing module comprises:
at least one distance measurement module coupled to the second emitting unit and configured to measure a distance between each of the at least one distance measurement module and a target object so as to generate the at least one distance information; and
a camera module coupled to the second emitting unit and configured to photograph a marker on the target object so as to generate the target image.

3. The transportation control system according to claim 2, wherein the at least one distance measurement module and the camera module are disposed on the transportation platform.

4. The transportation control system according to claim 1, wherein the at least one sensed signal comprises a plurality of target images, the processor generates a location difference according to the at least one sensed signal, and the processor generates the first motion command according to the location difference; the location difference comprises a moving information and a rotation information, and the at least one location sensing module comprises:
a plurality of camera modules coupled to the second emitting unit and configured to photograph a target object so as to generate the target images.

5. The transportation control system according to claim 4, wherein the camera modules are disposed at a periphery of the transportation platform, thus a preset distance is maintained between each of the plurality of camera modules and the transportation platform, and the camera modules are configured to photograph the target object and the transportation platform.

6. The transportation control system according to claim 4, wherein the second emitting unit and the camera modules are disposed on the transportation platform, and each of the plurality of camera modules is configured to photograph a marker on the target object.

7. The transportation control system according to claim 1, further comprising:
a mobile vehicle configured to be wirelessly connected to the first emitting unit, wherein the processer is configured to further generate a second motion command, and the mobile vehicle is configured to perform a displacement of the path according to the second motion command.

8. A transportation device comprising:
a transportation platform comprising:
a platform body; and
a motion mechanism supporting the platform body;
a controller coupled to the motion mechanism and configured to control the motion mechanism according to the first motion command, and the motion mechanism adjusts a location of the platform body;
at least one location sensing module configured to sense a target object in front of the transportation platform so as to generate at least one sensed signal; and
an emitting unit coupled to the at least one location sensing module and configured to transmit the at least one sensed signal.

9. The transportation device according to claim 8, wherein the motion mechanism comprises:
a plurality of electric cylinders controlled by the controller, wherein the controller is configured to control the electric cylinders according to the first motion command, and the electric cylinders adjust the location of the platform body.

10. The transportation device according to claim 8, wherein the location of the platform body is adjusted by a location difference, the location difference comprises a moving information and a rotation information, the moving information comprises a translation information and a lift information, and the motion mechanism comprises:

a connection body;

a slide rail on a top surface of the connection body;

a sliding portion fixed at a bottom surface of the platform body and slidably connected to the slide rail, wherein the controller is configured to control the sliding portion according to the first motion command, and the sliding portion moves by the translation information with respect to the slide rail;

a support body having a connection portion; and a support rod matched with the connection portion, wherein one of the support body and the support rod is coupled to the bottom surface of the connection body, and the controller is configured to control the support rod and the support body according to the first motion command, and the support rod and the support body relatively extend or retract by the lift information and relatively rotate by the rotation information.

11. The transportation device according to claim 8, wherein the at least one sensed signal comprises at least one distance information and a target image, and the at least one location sensing module comprises:

at least one distance measurement module disposed on the transportation platform, coupled to the emitting unit, and configured to measure a distance between the transportation platform and the target object so as to generate the at least one distance information; and a camera module coupled to the emitting unit and configured to photograph a marker on the target object from the transportation platform so as to generate the target image.

12. The transportation device according to claim 8, wherein the at least one sensed signal comprises a plurality of target images, and the at least one location sensing module comprises:

a plurality of camera modules coupled to the emitting unit and configured to photograph the target object and the platform body so as to generate the target images.

13. The transportation device according to claim 12, wherein the camera modules are disposed at a periphery of the transportation platform, thus a preset distance is maintained between each of the plurality of camera modules and the transportation platform, and the camera modules are configured to photograph the target object and the transportation platform from different directions.

14. The transportation device according to claim 12, wherein the emitting unit and the camera modules are disposed on the transportation platform, and each of the plurality of camera modules is configured to photograph a marker on the target object.

15. A transportation control method comprising:

receiving at least one sensed signal which corresponds to a location of a transportation platform;

generating a first motion command according to the at least one sensed signal;

transmitting the first motion command to a controller which controls the transportation platform;

controlling the transportation platform to move by the controller in response to the first motion command;

sensing a location of a target object from different sensing locations so as to generate the at least one sensed signal; and transmitting the at least one sensed signal.

16. The transportation control method according to claim 15, further comprising generating a location difference according to the at least one sensed signal and generating the first motion command according to the location difference, wherein the at least one sensed signal comprises at least one distance information and a target image, and the location difference comprises a moving information and a rotation information;

wherein the step of sensing the location of the target object from different sensing locations comprises:

measuring a distance between the transportation platform and the target object so as to generate the at least one distance information; and photographing a marker on the target object from the transportation platform so as to generate the target image; and wherein the step of generating the location difference according to the at least one sensed signal comprises:

generating the rotation information using the at least one distance information; and generating the moving information using the at least one distance information and the target image.

17. The transportation control method according to claim 15, further comprising generating a location difference according to the at least one sensed signal and generating, the first motion command according to the location difference, wherein the at least one sensed signal comprises a plurality of target images, and the location difference comprises a moving information and a rotation information;

wherein the step of sensing the location of the target object from different sensing locations comprises:

photographing the target object from different sensing locations so as to generate the target images; and wherein the step of generating the location difference according to the at least one sensed signal comprises:

generating the moving information and the rotation information using the target images.

18. The transportation control method according to claim 15, further comprising generating a location difference according to the at least one sensed signal and generating the first motion command according to the location difference, wherein the at least one sensed signal comprises a plurality of target images, and the location difference comprises a moving information and a rotation information;

wherein the step of sensing the location of the target object from different sensing locations comprises:

photographing a plurality of markers on the target object from different sensing locations so as to generate the target images; and wherein the step of generating the location difference according to the at least one sensed signal comprises:

generating the moving information and the rotation information using the target images.

19. The transportation control method according to claim 15, wherein the location difference comprises a moving information and a rotation information, the moving information comprises a translation information and a lift information, and in the step of controlling the transportation platform to move by the controller in response to the first motion command, the transportation platform translates by a distance of the translation information, adjusts by a height of the lift information, and rotates by an angle of the rotation information under the control of the controller.

20. The transportation control method according to claim 15, further comprising receiving a completion signal from the controller;

generating a second motion command according to the completion signal; and wirelessly transmitting the second motion command to a mobile vehicle.

* * * * *